(12) United States Patent
Akahane et al.

(10) Patent No.: US 6,778,532 B1
(45) Date of Patent: Aug. 17, 2004

(54) PACKET RELAYING APPARATUS AND HIGH SPEED MULTICAST SYSTEM

(75) Inventors: Shinichi Akahane, Tokyo (JP); Kazuo Sugai, Ebina (JP); Takeshi Aimoto, Sagamihara (JP); Nobuhito Matsuyama, Hadano (JP); Yoshihito Sako, Hadano (JP); Hiroshi Sekino, Isehara (JP)

(73) Assignees: Hitachi, Ltd., Tokyo (JP); Hitachi Information Technology Co., Ltd., Hadano (JP)

( * ) Notice: Subject to any disclaimer, the term of this patent is extended or adjusted under 35 U.S.C. 154(b) by 0 days.

(21) Appl. No.: 09/389,301

(22) Filed: Sep. 2, 1999

(30) Foreign Application Priority Data

Oct. 5, 1998 (JP) .......................................... 10-282205

(51) Int. Cl.⁷ .................................................. H04J 1/10
(52) U.S. Cl. ......................... 370/392; 370/390; 370/389
(58) Field of Search ................................. 370/390, 392, 370/400, 401, 408, 432, 389, 431, 471, 255, 256

(56) References Cited

U.S. PATENT DOCUMENTS

| | | | |
|---|---|---|---|
| 5,386,413 A | * | 1/1995 | McAuley et al. |
| 5,414,704 A | * | 5/1995 | Spinney |
| 5,826,262 A | * | 10/1998 | Bui et al. |
| 5,831,975 A | * | 11/1998 | Chen et al. |
| 5,873,078 A | * | 2/1999 | Angle et al. |
| 5,917,821 A | * | 6/1999 | Gobuyan |
| 5,946,679 A | * | 8/1999 | Ahuja et al. |
| 6,032,190 A | * | 2/2000 | Bremer et al. |
| 6,061,712 A | * | 5/2000 | Tzeng |
| 6,091,725 A | * | 7/2000 | Cheriton et al. |
| 6,157,622 A | * | 12/2000 | Tanaka et al. |
| 6,201,808 B1 | * | 3/2001 | Wang et al. |
| 6,396,842 B1 | * | 5/2002 | Rochberger |
| 6,452,908 B1 | * | 9/2002 | Yamada et al. |

OTHER PUBLICATIONS

Multicast and Self–Routing in ATM Radix Trees and Banyan Networks; Law et al; Infocom Feb. 4, 1995, v3, pp 951–955.*

* cited by examiner

*Primary Examiner*—Ajit Patel
*Assistant Examiner*—Steven Blount
(74) *Attorney, Agent, or Firm*—Antonelli, Terry, Stout & Kraus, LLP

(57) ABSTRACT

In a high speed multicast route searching method of searching of information of a transmission port to which a received multicast packet is next transferred: a route address is formed by coupling a receiver address and a sender address in this order; one p-th power-of-2-branch tree node is configured by a collection of one two-branch tree node and two-branch tree nodes of p–1 stages totalling ((p-th power of 2)–1) nodes just under the one two-branch tree node to form a p-th power-of-2-branch tree which is stored in a memory; not one bit but consecutive p bits of the route address coupling the receiver address and sender address in a received multicast packet in this order are checked at the same time; and in accordance with the values of the consecutive bits, a search tree stored in the memory is searched. In this manner, a search process can be completed by tracing nodes (the number of bits of a search key divided by p) times at a maximum, independently from the number of entries.

2 Claims, 21 Drawing Sheets

| ROUTE ADDRESS | ROUTE ADDRESS MASK LENGTH |
|---|---|
| 0 0 0 | 0 |
| 0 0 1 | 3 |
| 0 1 0 | 2 |
| 1 0 0 | 1 |
| 1 1 0 | 3 |

MULTICAST ROUTING TABLE

| ROUTE ADDRESS | ROUTE ADDRESS MASK LENGTH |
|---|---|
| 0x00000000 : | 0 |
| 0x85040000 : | 16 |
| 0x85050000 : | 16 |

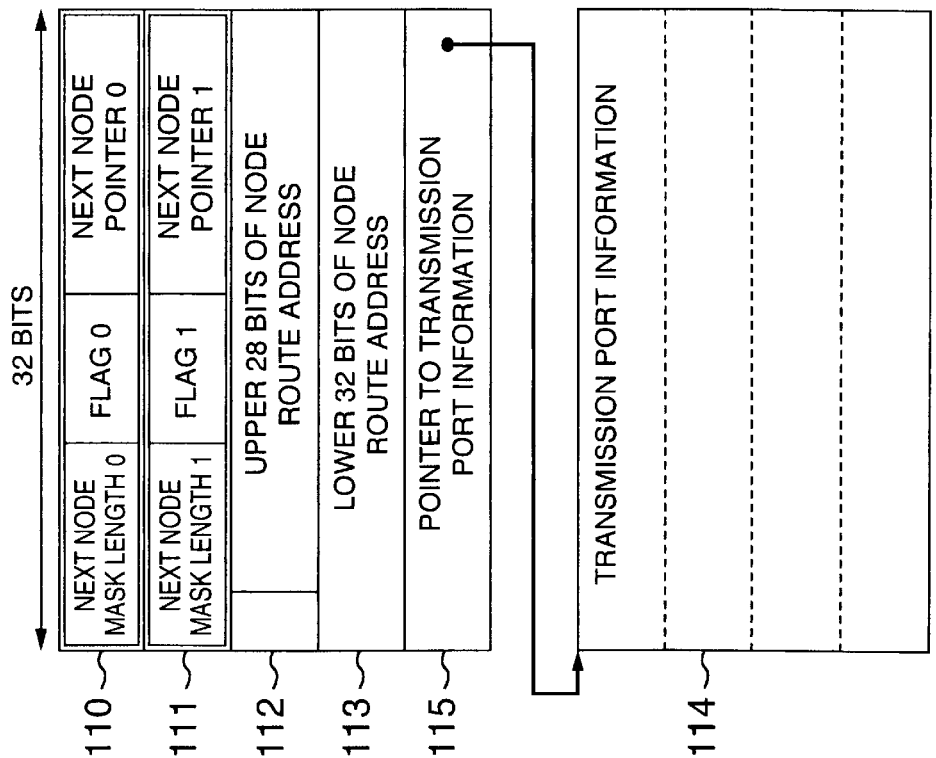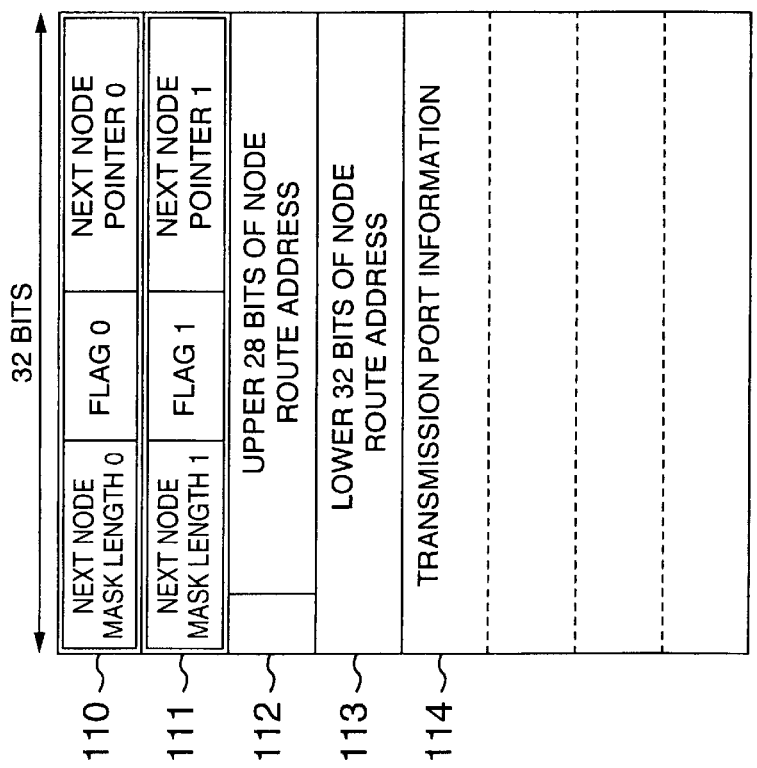

SELECT BASED ON VALUES OF 0-TH TO 2-ND BITS OF ROUTE ADDRESS IN RECEIVED PACKET

SELECT BASED ON VALUES OF 0-TH TO 3-RD BITS OF ROUTE ADDRESS IN RECEIVED PACKET

SELECT BASED ON VALUES OF 0-TH TO 4-TH BITS OF ROUTE ADDRESS IN RECEIVED PACKET

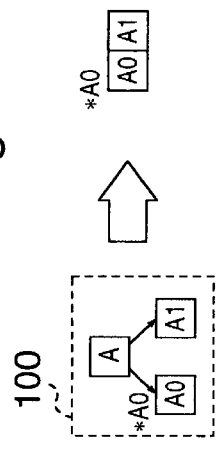
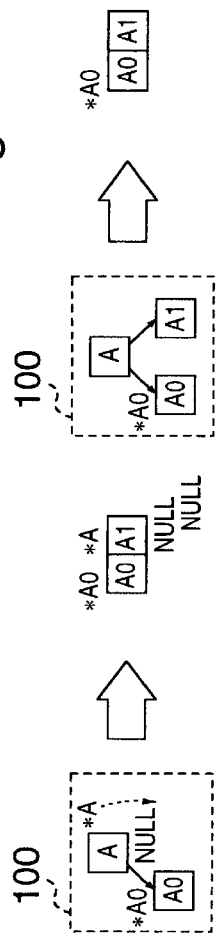
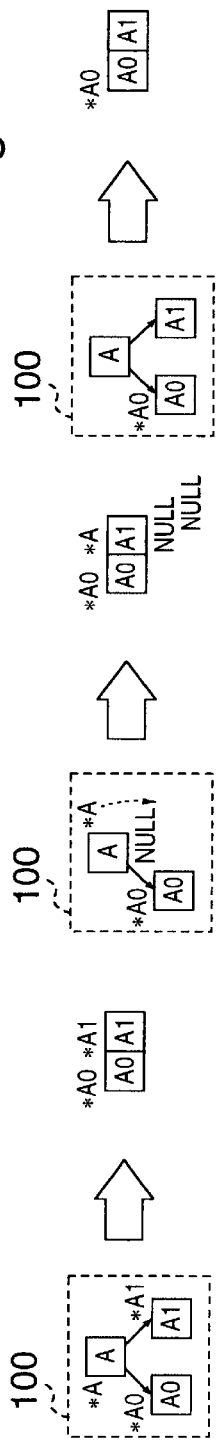
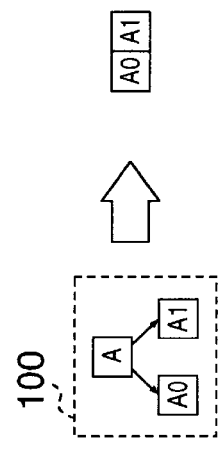
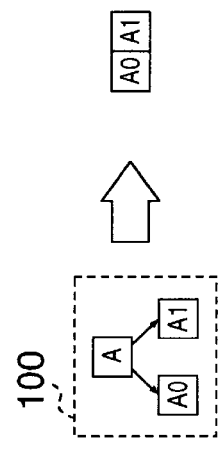
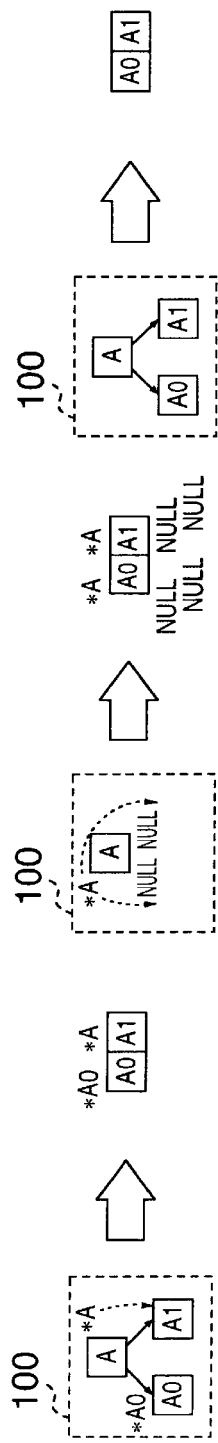
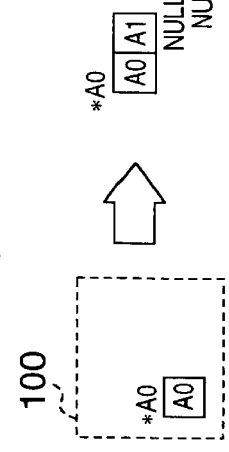
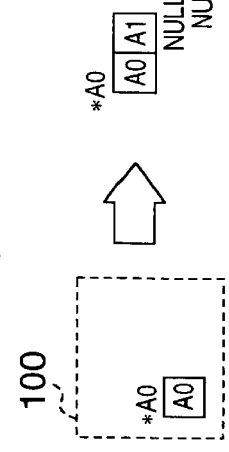
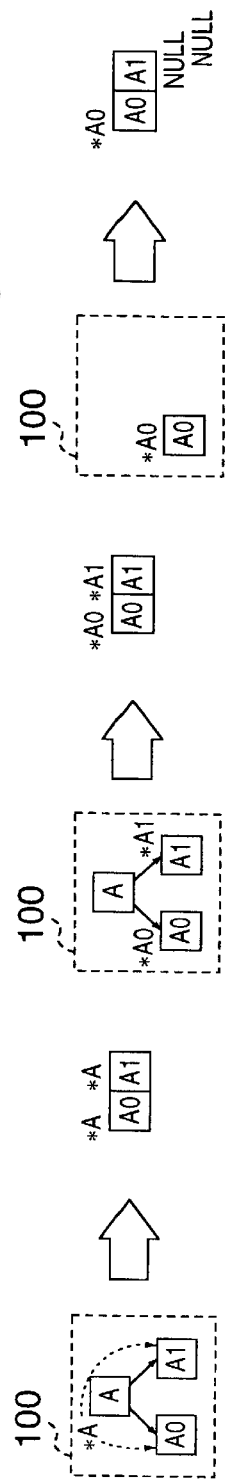

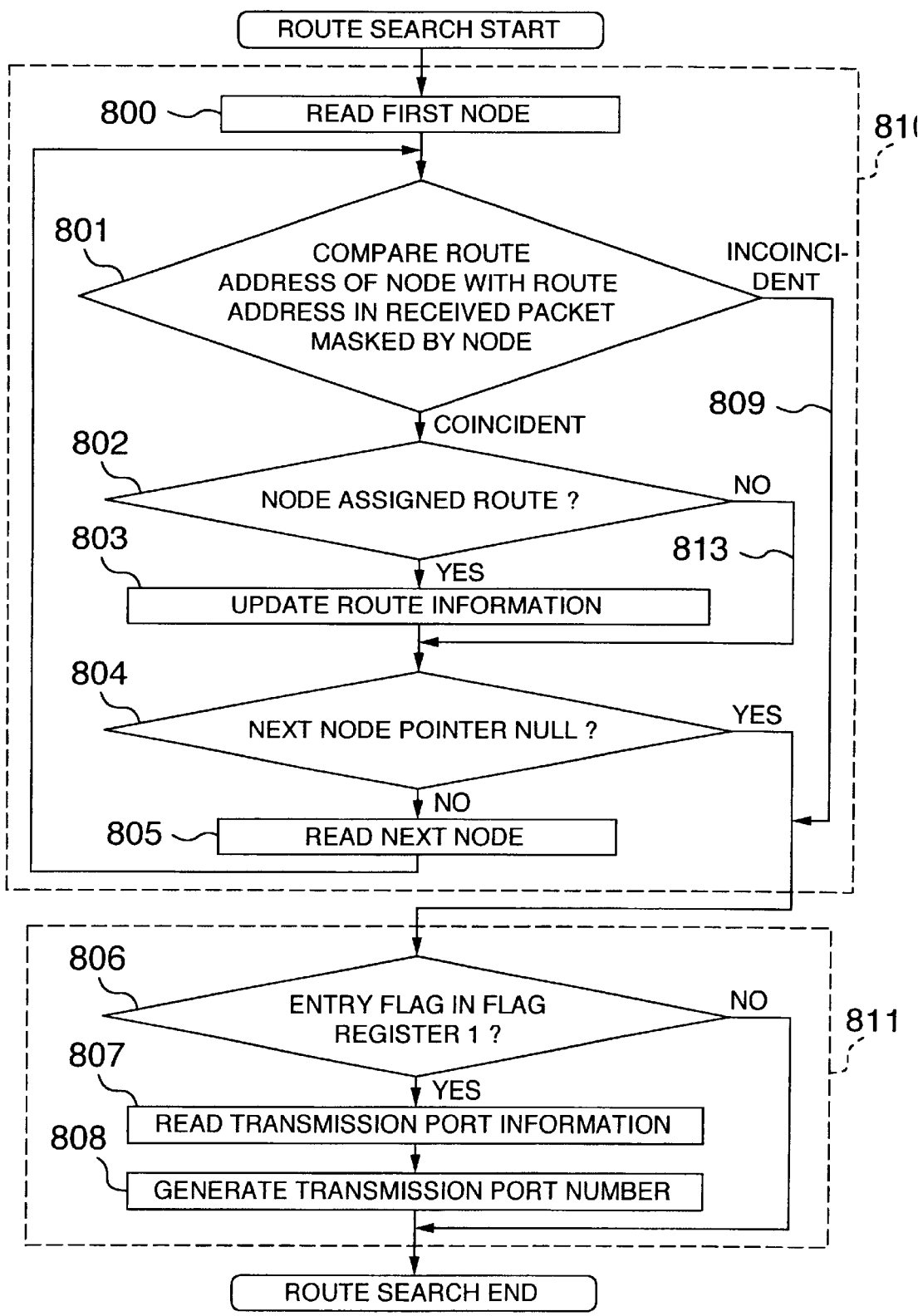

PACKET RELAYING APPARATUS AND HIGH SPEED MULTICAST SYSTEM

BACKGROUND OF THE INVENTION

The present invention relates to a packet relaying apparatus for relaying a packet in a plurality of interconnected networks, and more particularly to a method of searching a next node to which a multicast packet is transmitted.

As the number of users of the Internet increases and the traffic (packets) on the Internet rapidly increases, the scale and speed of the Internet are becoming large and high. In the current Internet (packet communication network by Internet Protocol: hereinafter called an IP network), not only conventional data communication applications, but also real time applications such as Internet phones and Internet broadcasting are used to provide a voice communication function and a broadcasting function. Under such circumstances, IP multicast techniques for the IP network are expected as effective techniques for the distribution of multimedia data such as moving images, voices and contents on the Internet.

Support and high speed operation of a packet relaying apparatus (router) constituting the IP network are the main issue of IP multicast techniques.

In unicast communication for transmitting a packet from one terminal to another specific terminal, a router searches from a routing table, route information corresponding to a receiver IP address contained in a header of a received packet, and transmits the received packet to the next router. The route information includes an IP address of the next router or a terminal and a transmission port number of the router. A route search for unicast will be briefly described.

The routing table stores a plurality of information groups for each receiver IP address, the information groups including a corresponding sub-network address, a sub-net mask length, and the route information. This information group is called an entry. The sub-network is a partial collection of terminals such as a receiver corporate network. The sub-network address is an address group which is obtained by coupling IP addresses of the partial collection as address information. The sub-net mask length is a value indicating how many upper bits of an IP address are an identifier of the sub-network. The router compares the sub-network address in the entry with the effective upper bits, masked by the sub-net mask length in the entry, of a receiver IP address contained in a received packet. The router-uses the route information in the coincident entry as the search result. Since the entry is configured in the unit of sub-network, the number of entries in the routing table can be reduced considerably and the search process is made efficient. If it is judged that a plurality of entries are coincident, the route information in the entry having the longest sub-net mask length is used as the search result. In the following, this search is called a longest coincidence search.

In multicast communication for transmitting a packet from one terminal to a plurality of specific terminals, each entry of the routing table includes a sender sub-net address, an address mask, a multicast group address and route information. The multicast group address is an identifier assigned to a plurality of receiver collections (hereinafter called a multicast group) to which the sender transmits the packet. A router searches the routing table by using as a search key a multicast group address in the sender IP address and receiver IP addresses in the header field of a received packet. In multicast, the route information of an entry with a search coincidence is constituted of a plurality of transmission port numbers. In accordance with the transmission port numbers, the router copies the received packet and transmits it to the specific multicast group. If the load of the search process and copy process is heavy and the performance of multicast communication is low, the total performance of the router which executes a multicast packet transfer may be degraded. From this reason, a high speed operation is required similar to a usual unicast packet relaying process.

A high speed operation to be attained through a router load dispersion method is described, for example, in JP-A-6-197111 laid-open on Jul. 15, 1994 (hereinafter called "first related art"). This first related art aims to realize a router capable of a high speed relay operation through a load dispersion method. A plurality of packet relay modules are connected to a bus, and each packet relay module provides a packet relay function by referring to routing table information supplied from a management unit connected to the bus. If the number of packet relay modules is increased, the performance can be improved. The packet relay module of the first related art includes: a routing processing unit which derives the header of a received packet and performs a search process for a packet receiver; and a transfer processing unit which stores the received packet in a memory and transfers the received packet to another packet relay module designated by the search result. Since the different processing units take partial charge of the relay function, the packet relay process can be speeded up. However, the first related art does not describe a high speed multicast packet relay process.

A search (hereinafter called a multicast route search) of a receiver of a multicast packet to be performed by a router is described, for example, in "TCP/IP Illustrated, Volume 2 The Implementation", 1995, pp. 416–421 (Addison-Wesley Publishing Company) (hereinafter called a second related art). According to the second related art, the routing table search is speeded up by using a hash search method. If the routing table information is directly searched, the time taken to execute a search process becomes considerably long as the number of receiver IP addresses increases and the number of entries of the table increases. According to the second related art, a sender ID address in a received packet is used as a key for calculating a hash value, and a routing table group is provided which stores grouped entries of the receiver IP addresses having the same hash value.

When a multicast packet is received, the route search processing unit in the router calculates the hash value from the sender IP address in the received packet and the routing table corresponding to the hash value is searched. Since the search range of the routing table is limited in accordance with the hash value, the route search can be speeded up.

A Radish algorithm is known as one of route searching methods. The Radish algorithm is described, for example, in "A technical memo of WIDE project, Kazukio Yamamoto, Akira Kato and Akira Watanabe, Radish-A Simple Table Structure for CIDR (hereinafter called a third related art).

A routing table of the Radish type uses entries of a two-branch tree structure to speed up the route search. More specifically, each entry is allocated to each of a plurality of apexes (nodes) interconnected by right and left pointers of each node constituting a two-branch tree structure wherein the root (two-branch tree root) corresponds to the highest bit of an IP address format. When this two-branch tree structure is searched, the receiver IP address in a received packet is checked one bit after another starting from the highest bit, and one of right and left pointers is selected in accordance with the checked bit value (0 or 1) to move to the next node. With this search, the node assigned the target entry can be reached.

According to the third related art, the two-branch tree is traced by checking the receiver IP address one bit after another. Therefore, even if the number of entries of the routing table becomes large, the search can be completed by performing a check (tracing the two-branch tree) as many as the number of bits of the receiver IP address at the maximum.

Similar to the case wherein there are a plurality of matched entries having different mask lengths as described in the route search for unicast, there are also a plurality of matched entries while the tree is traced by searching the routing table of the Radish type of the third related area. Each time an entry is matched, a candidate for the route information in the entry is stored, and if a new entry is matched, the previous candidate is updated to the new candidate to satisfy the longest coincidence search specification.

Techniques of performing a unicast route search at high speed by using the Radish method of the third related art is disclosed in the paper "High Speed Search Method for IP Routing Table by Hardware", PROCEEDINGS OF THE 1998 COMMUNICATIONS SOCIETY CONFERENCE of the Institute of Electronics, Information and Communication Engineers (IEICE), B-7-123, p. 244 (hereinafter called a fourth related art). According to the fourth related art, a next node selector circuit, a network address comparator circuit and a search completion judging circuit are provided. The network address comparator circuit is used for checking at the same time one or a plurality of consecutive bits to be checked at a branch omitted as unnecessary from the two-branch tree of the Radish type, by comparing a network address at the node and the receiver IP address in a received packet masked by the node. If the comparison result indicates a coincidence, it means that a correct node was reached, whereas if incoincidence, it means that an incorrect node was reached.

According to the fourth related art, a next node selection process and the network address comparison process are executed in parallel to speed up the route search process.

Techniques of performing a unicast route search at high speed by using a Patricia Trie search algorithm similar to the Radish type are described in "Development of High Speed IP Address Solution H/W Engine", PROCEEDINGS OF THE 1998 COMMUNICATION SOCIETY CONFERENCE OF IEICE, B-6-90, p. 90 (hereinafter called a fifth related art). Similar to the fourth related art, the fifth related area speeds up the route search by executing tree structure searching processes in parallel.

Techniques of further speeding up the unicast route search by using a Patricia Trie search algorithm is described in "High Speed Search Method for IP Routing Table by Multiway Tree", PROCEEDINGS OF THE 1998 COMMUNICATIONS SOCIETY CONFERENCE OF IEICE, B-7-124, p. 245 (hereinafter called a sixth related art). According to the sixth related art, the two-branch tree structure using the Patricia Trie algorithm is changed to the N-th power-of-2-branch tree in order to speed up the route search.

Techniques of speeding up the unicast route search with the longest coincidence search is described in JP-A-10-222535 laid-open on Aug. 21, 1998 (hereinafter called a seventh related art). According to the seventh related art, the two-branch tree is structured by a method different from the Radish type of the third related art. By using a data search circuit made of hardware, the longest coincidence search for the two-branch tree is performed at high speed. More specifically, with the two-branch tree searching method of the seventh related art, the receiver IP address in a received packet which is sub-net masked by the node is compared with the sub-network address of the node. If the comparison result indicates a coincidence, the route information of this node is used as the search result to terminate the route search, where as if incoincidence, the masked receiver address and the sub-network address of the node are assumed to be an integer not smaller than 0, and both the addresses are compared to trace one of right and left branches of the two-branch tree in accordance with the comparison result. In this case, if entries having the longer mask length are disposed at the upper level of the two-branch tree, the search is performed in the order of longer mask length so that the longest coincidence search can be realized. The contents of the seventh related art have been described above on the assumption that the mask length is defined as a value indicating what upper bits are valid as the sub-network address. However, in the specification of the seventh related art, the mask length is defined as a length of lower bits different from the sub-network address portion of the IP address. Also, the longest coincidence search method is called a best match method. This best match method adopts the shortest mask length as the search result.

SUMMARY OF THE INVENTION

The present IP multicast communication is only used limitatively in the multicast network virtually configured on the Internet. The scale of the multicast network is not so large and the search process and transfer process of multicast communication do not degrade the transfer performance of a rooter as yet. However, if applications using the multicast function are prevailed on the Internet in the future, the number of entries of the multicast routing table in a rooter becomes large. Therefore, it is desired to realize a high speed operation of a search process for the routing table even under the conditions of a large number of entries.

The multicast route searching method of the hash type is described in the second related art. With the hash type, however, the method of calculating a hash value is always the same irrespective of the number of entries. It is not possible to flexibly increase the number of routing table groups in accordance with an increase in the number of entries. Therefore, if the number of entries increases, the grouped routing table itself becomes large and an average search time becomes long.

As compared to the hash type, the unicast route searching method using the Radish algorithm has a merit that even if the number of entries in the routing table increases, the search process time does not become long.

However, the third and fifth related arts do not describe a multicast route search using the Radish algorithm (or Patricia Trie algorithm).

Although the sixth related art describes the maximum search time shortened by 1/N by changing the two-branch tree structure to N-th power-of-2-branch trees, it does not describe the multicast route search.

Neither the seventh related art describes a high speed operation of the multicast route search. The two-branch tree structure of the third related art is determined uniquely by the entries to be registered and its maximum search time is determined by the number of bits of a search key. In contrast, the two-branch tree, structure of the seventh related art may have in some cases a tree having nodes coupled long in one direction and a long average search time, depending upon a tree configuring method. In order to avoid such a tree having a long train of nodes, it is necessary to use an algorithm which makes the two-branch tree broaden uniformly. The seventh related art, however, does not describe such an algorithm. The seventh related art describes that when the two-branch tree of the seventh related area is configured, if entries having the longer mask length are disposed at the upper level of the two-branch tree, the search is performed in the order of longer mask length so that the longest coincidence search can be realized. However, the details of coupling nodes having different mask length are not given. Furthermore, as different from the third related art in which right and left branches of a two-branch tree are not traced in accordance with the check bit value, the seventh related art traces the right and left branches of the two-branch tree in accordance with the comparison result of addresses. Therefore, a p-th power-of-2-branch system cannot be realized.

It is an object of the invention to provide means for speeding up a multicast packet route search process during the relay process for a multicast packet.

It is another object of the invention to provide means for applying a two-branch tree searching method using a Radish algorithm to a multicast route search.

It is another object of the invention to provide means for applying, to a multicast route searching method, a route searching method which provides the number of node tracing times smaller than the large number of bits of a search key and a short maximum search time.

It is another object of the invention to provide a circuit structure capable of performing a route search process at high speed in accordance with a two-branch tree searching method for a multicast routing table by using a Radish algorithm.

According to one aspect of the present invention, in a multicast route search using as a search key a packet sender terminal IP address (sender IP address) and a packet receiver multicast group address (receiver multicast group address), the sender ID address and receiver multicast group address are coupled to form and define one route address. In accordance with a bit pattern of this route address, a multicast routing table of a two-branch tree is configured. Each bit starting from an upper bit of the route address coupling the sender ID address and receiver multicast group address in a received multicast packet is checked, and in accordance with a value of the checked bit, a search tree of a two-branch tree structure is searched.

According to another aspect of the present invention, the route address is defined by coupling the receiver multicast group address and sender ID address in this order, and in accordance with a bit pattern of this route address, the multicast routing table of the two-branch tree is configured.

According to another aspect of the present invention, the number of branches of each node constituting a search tree of the two-branch tree is increased by a power of 2, from a two-branch tree node to a four-branch tree node, an eight-branch tree node, or generally a p-th power-of-2-branch tree to configure a multicast routing table of the p-th power-of-2-branch tree structure. Not one bit per one node, but consecutive two bits, three bits, or generally p bits of the route address coupling the receiver multicast group address and sender IP address in a received multicast packet in this order are checked at the same time. In accordance with the values of the consecutive bits, the multicast routing table of the p-th power-of-2-branch is searched.

According to another aspect of the present invention, as the route address, the multicast group address itself is not used but the multicast group ID of the lower 28 bits of the multicast group address and the sender IP address coupled in this order are used. In accordance with the bit pattern of this route address, the multicast routing table is configured as a two-branch tree or a p-th power-of-2-branch tree.

According to another aspect of the present invention, in order to reduce the memory capacity of a search key, when a p-th power-of-2-branch tree is formed, a collection of one two-branch tree node and two-branch tree nodes of (p−1) stages, totalling in ((a p-th power of 2)−1) nodes just under the one upper node, is used as one p-th power-of-2-branch tree node. In this case, the (p−1)-th power of 2) two-branch nodes at the lowest stage collected are embedded with the entry data assigned to the nodes at the higher stages to form one p-th power-of-2-branch tree node by using ((p−1)-th power of 2) two-branch nodes. In this case, one element of node data common to a plurality of two-branch tree is stored.

According to another aspect of the present invention, in converting two-branch tree nodes into a p-th power-of-2-branch tree, in order to reduce the memory capacity for the p-th power-of-2-branch tree node and to made equal the memory amount of each p-th power-of-2-branch tree node, the transmission port information is separated from the node data of the search tree and stored in another area of a memory. As a result, the data amount of the two-branch tree node assigned an entry becomes equal to the data amount of the two-branch tree node not assigned an entry, to thereby configure a p-th power-of-2-branch tree nodes by collecting such two-branch tree nodes.

According to another aspect of the present invention, as to the mask length indicating the position of a bit of the route address to be checked, the mask length of each p-th power-of-2-branch tree node is not stored but the mask length of another node just under the p-th power-of-2-branch tree node is stored. In this case, all the data of the node is not read from storage means storing the search tree data to be used for a route search process, but only the necessary portion of the node data is read by using the mask length stored in the node data which was read immediately before.

According to another aspect of the present invention, at the start of the node data, a flag indicating whether an entry is assigned to the node is provided. This flag is first read, and if the entry is not assigned, the route information of this node is not read.

According to another aspect of the present invention, (m-power of 2) p-th power-of-2-branch tree nodes corresponding in number to the upper m bits of the route address are developed on the storage means at predetermined positions. Each of the developed nodes is being set in one-to-one correspondence with each value which the 0-th bit to (m−1)-th bit of the route address can take. In accordance with the 0-th bit to (m−1)-th bit of the route address, one of the developed nodes is selected.

According to another aspect of the present invention, there is provided a circuit for searching a multicast routing table of a p-th power-of-2-branch tree structure in which: a route address is formed by coupling a receiver address and a sender address in this order; storing means is provided for storing by developing (m-th power of 2) p-th power-of-2-branch tree nodes of a p-th power-of-2-branch tree structure corresponding to the upper m bits of the route address, at predetermined positions; one of the developed nodes in the storage means at predetermined positions is selected in accordance with the 0-th bit to (m−1)-th bit of the route address coupling the receiver address and sender address; and every p bits of the route address after the m-th bit of the route address are checked.

Other objects and features of the present invention will become apparent from the following description when read in conjunction with the accompanying drawing.

BRIEF DESCRIPTION OF THE DRAWINGS

FIGS. 12a and 12b are diagrams showing the data structure of a two-branch tree node.

FIGS. 17a to 17i illustrate how three two-branch tree nodes are reduced to two two-branch tree nodes to use them as a four-branch tree node.

FIG. 22 is a flow chart illustrating a search process to be executed by a route search processing unit according to an embodiment of the invention.

DETAILED DESCRIPTION OF EMBODIMENTS

First, the structure of a network which helps understand the description of embodiments of the invention and a packet,relaying operation in the network will be described with reference to FIGS. 2, 3a to 3c and 4.

Figure 2:
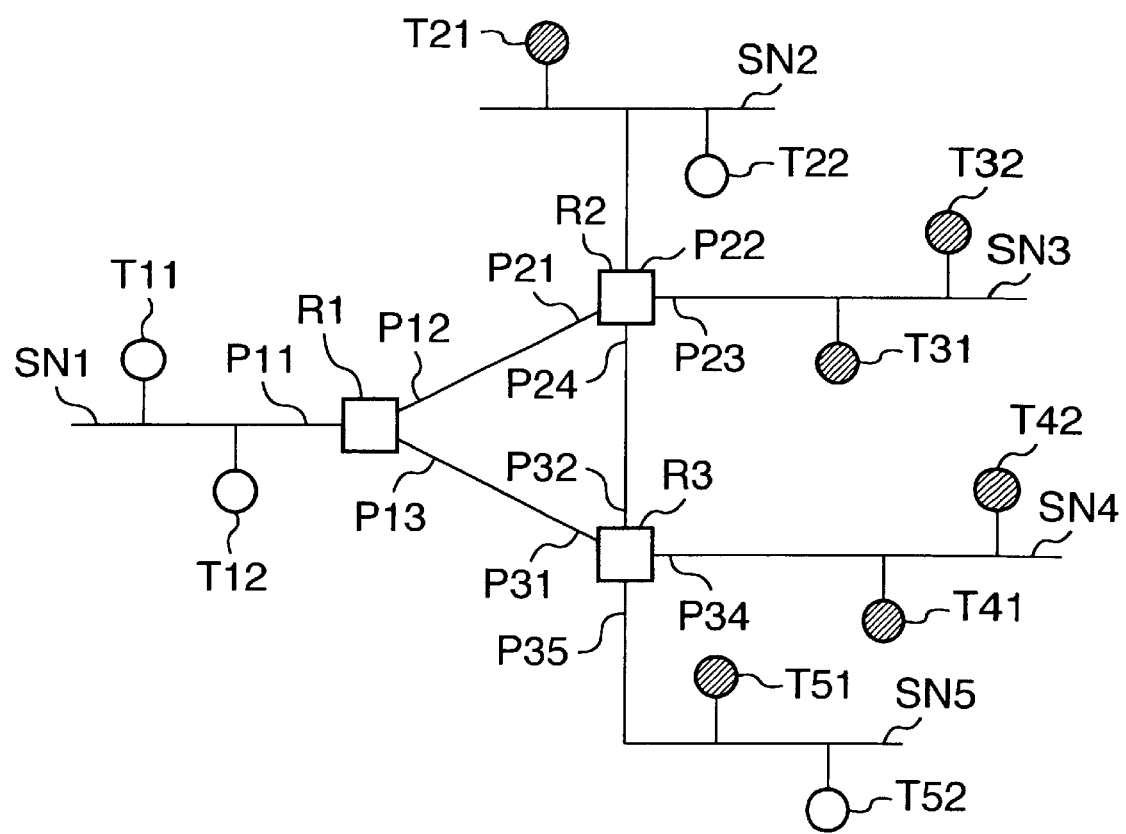
FIG. 2 is a diagram showing an example of the structure of a network suitable for use with the description of embodiments of the invention.

A network shown in FIG. 2 is constituted of: terminals (T11, T12, T21, T22, T31, T32, T41, T422, T51, T52) to and from which a packet is transferred; sub-networks (SN1 to SN5) for interconnecting the terminals; and routers (R1 to R3) for interconnecting the sub-networks. The router R1 has ports P11, P12 and P13, the router R2 has ports P21, P22, P23 and P24, and the router R3 has ports P31, P32 P34 and P35. Each terminal is assigned an address as an identifier. For example, each terminal of an IP network is assigned an IP address of 32 bits. An IP address will be described with reference to FIG. 3a. An IP address 1 shown in FIG. 3a has a sub-network address 2 and a host address 3.

The sub-network address is an identifier of the sub-network, and the host address is an identifier of a terminal in the sub-network. The number of bits of the sub-network is indicated by a sub-net mask length. The sub-network address can be obtained from an IP address by calculating the logical products of the IP address bits and the effective upper bits masked (sub-net masked) by the sub-net mask length.

Figure 3A:
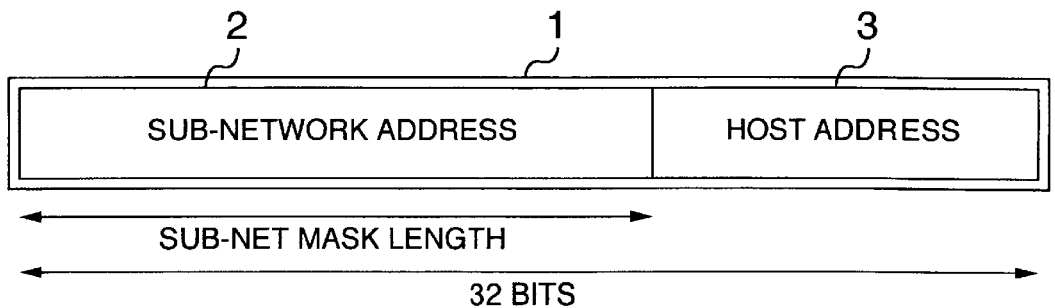
FIGS. 3a, 3b, and 3c show the format of an IP address, the format of an IP address of the class D, and the format of a header of an IP packet, respectively.
Figure 3B:
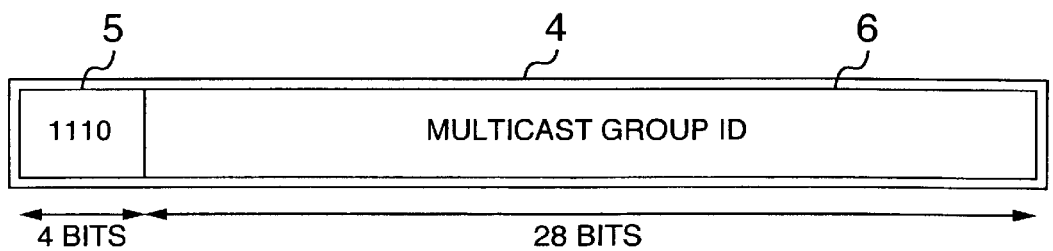
Figure 3C:
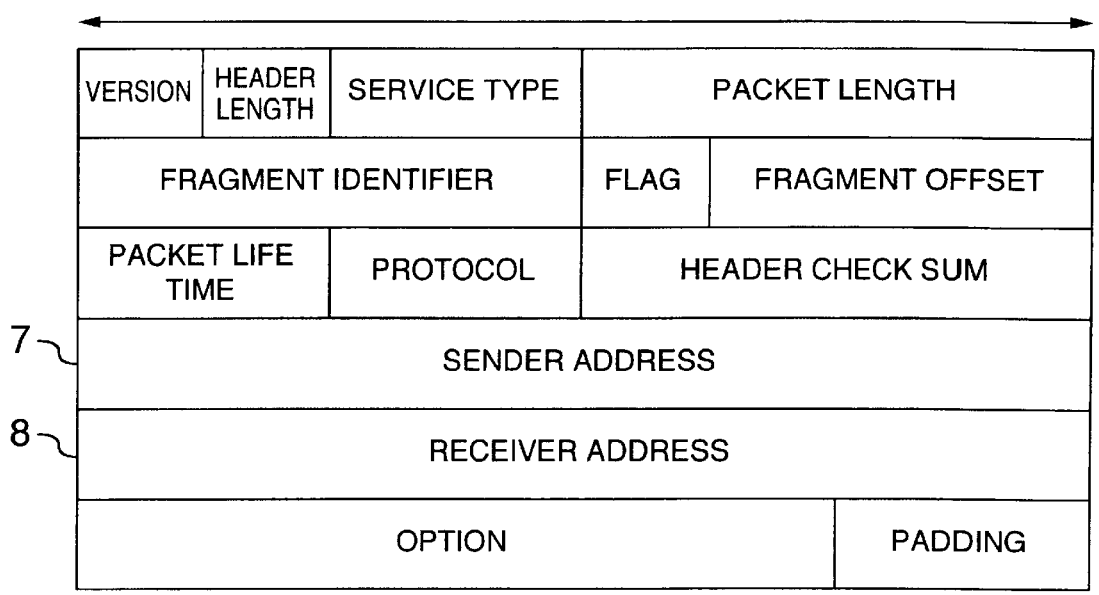

Next, a packet relaying operation in unicast communication of transmitting a packet from one terminal to another terminal will be described with reference to FIG. 2. It is assumed for example that a unicast packet is transmitted from the terminal T11 to the terminal T22. A header format of a packet to be transmitted is shown in FIG. 3c. In a sender IP address filed 7 shown in FIG. 3c, an IP address of the sender terminal T11 is stored, and in a receiver IP address field 8; an IP address of the, receiver terminal T22 is stored.

When the router R1 receives the unicast packet from the terminal T11, the router R1 checks the receiver IP address field in the packet header so that it can recognize that the receiver terminal T22 is on the sub-network SN2 and the sub-network SN2 is connected to the router R2. The router R1 then decides the IP address (called a next hop IP address) of the router R2 and the port P12 and transmits the packet. When the router R2 receives the unicast packet from the router R1, the router R2 checks the receiver IP address field in the packet header so that it can recognize that the receiver terminal T22 is on the sub-network SN2 and the sub-network SN2 is directly connected to the router R2. The router R2 then decides the next hop IP address (in this example, IP address of the terminal T22) and the port P22 and transmits the packet.

Figure 4:
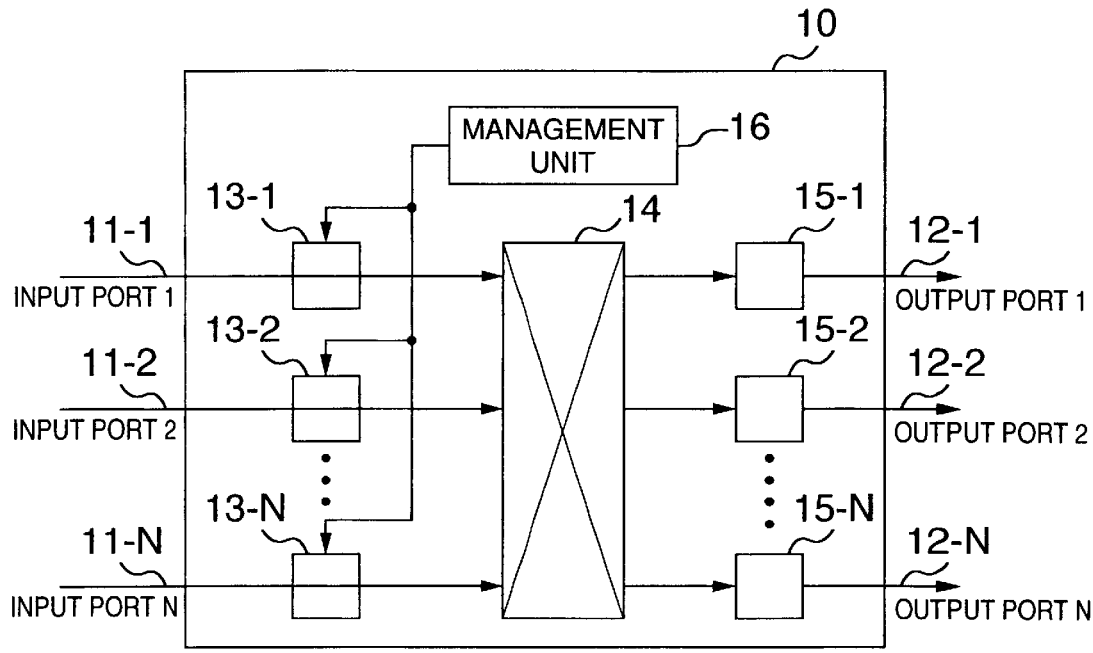
FIG. 4 is a block diagram showing an example of the structure of a general router.

Next, the structure of the rooter and the operation of relaying a unicast packet to be executed by the rooter will be described with reference to FIG. 4. A rooter 10 shown in FIG. 4 is constituted of input ports 11-i (i=1 to N), output ports 12-i I=1 to N), a routing unit 13-i (i=1 to N), a switch 14, communication control units 15-i (i=1 to N), and a managing unit 16. When a unicast packet is input to the input port 11-i, the routing unit 13-i searches a unicast routing table by using as a key the receiver IP address in the header of the packet. With this search, the next hop IP address and the number (transmission port number) of the output port 12-i are decided. The packet added with the next hop IP address and transmission port number is supplied to the switch 14. The switch 14 switches the packet to the communication control unit 15-i having the output port 12-i corresponding to the transmission port number. The communication control unit 15-i received the switched packet decides a MAC (media access control) address of the data link layer corresponding to the next hop IP address added to the packet, in accordance with a correspondence table, adds the MAC address to the packet as a receiver MAC address, and sends the packet to the output port 12-i corresponding to the transmission port number.

The unicast routing table is formed by the managing unit 16 which exchanges connection information with other routers and distributes-the table to each routing unit 13-i. The managing unit also exchanges information on the data link layer with other routers and terminals to form the correspondence table between each next hop IP address and each MAC address of a router and terminal having the next hop IP address, and distributes the table to each communication control unit 15-i.

Next, a packet relaying operation in multicast communication of transmitting a packet from one terminal to a plurality of terminals will be described with reference to FIG. 2. It is assumed for example that a multicast packet is transmitted from the terminal T11 to the terminals (T21, T31, T32, T41, T42 and T51) belonging to a specific multicast group. The multicast group is identified by an IP address (multicast group address) of a class D. The structure of an IP address of the class D is shown in FIG. 3b. An IP address 4 of the class D is constituted of upper 4-bits "1110" representative of the class D indicated at 5 and a multicast group ID (hereinafter abbreviated as GID) of 28 bits indicated at 6. The multicast group identified by the multicast group address can cover a plurality of sub-networks. The member structure of terminals belonging to the group is dynamic and each terminal can participate in or secedes from the multicast group.

In the sender IP address field (7 in FIG. 3c) in the header of the multicast packet transmitted from the terminal T11 to the multicast group, the IP address of the sender terminal T11 is stored, and in the receiver IP address field (8 in FIG. 3c), a receiver multicast group address is stored as different from the unicast packet. As different from the unicast packet, the router R1 received the multicast packet from the terminal T11 checks two fields, the sender IP address field and receiver IP address field in the packet header, so that it can recognize that the sender terminal T11 of the multicast packet is on the sub-network SN1. The router R1 decides the transmission ports P12 and P13 and outputs a copy of the packet from these ports, in order to transmit the packet from the sub-network SN1 to all terminals belonging to the receiver multicast address. The router R2 received the multicast packet from the router R1 performs a check similar to the router R1 so that it can recognize that the sender terminal T11 of the multicast packet is on-the sub-network SN1, and the router R2 decides the transmission ports P22 and P23 and outputs a copy of the packet from these ports, in order to transmit the packet from the,sub-networks SN2 and SN3 having the terminal belonging to the receiver multicast address.

Similarly, the router R3 decides the ports P34 and P35 and outputs a copy of the packet received via the router R1 from these ports.

Next, the relaying operation of a multicast packet to be executed by a router will be described with reference to FIG. 4.

When a multicast packet is input to the input port 11-i, the routing unit 13-i searches a multicast routing table by using as a key the sender IP address and receiver IP address (receiver multicast address) in the header of the packet. With this search, the number (transmission port number) or numbers of one or a plurality of output ports 12-i are decided, and a copy of the received packet added with each transmission port number is sent to the switch 14. The switch 14 switches the packet to the communication control unit 15-i having the output port 12-i corresponding to each transmission port number. The communication control-unit 15-i received the switched packet generates a multicast MAC address of the data link layer by using the receiver multicast address in-the header of the multicast packet, adds the MAC address to the packet as the receiver MAC address, and sends the packet to the output port 12-i corresponding to each transmission port number, as different from the case of the unicast packet.

Similar to the unicast routing table, the multicast touting table is formed by the managing unit 16 which exchanges connection information with other routers and distribute the table to each routing unit 13-i.

Next, the whole structure of a router according to an embodiment of the invention will be described with reference to FIG. 1.

The structure of a router 700 will be described with reference to FIG. 1. Reference numeral 500 represents a switch corresponding to the switch 14 shown in FIG. 4. A management unit 601 is connected to the switch 505. The managing unit 601 has a function of managing the router and collecting and distributing routing information. The managing unit 601 corresponds to the managing unit 16 shown in FIG. 4. The switch 505 can be connected to a plurality of packet processing units 600 having a function of relaying a packet at high speed. The packet processing unit 600 corresponds to the routing unit 13-i shown in FIG. 4. The managing unit 601 distributes the routing table to each packet processing unit 600 which performs a packet relaying process in accordance with the routing table to thereby realize the functions of the router.

Each packet processing unit 600 is connected to communication control units 501, 602 and 603 (corresponding to the communication control unit 15-i in FIG. 4) each having communication ports for network interconnection. The communication control unit can be connected to various types of networks. The communication control unit can be connected to one or a plurality of networks depending upon the communication speed of each network, by providing one port for high speed communication (e.g, 500 in FIG. 1) and a plurality of ports for low speed communication (e.g., 604 and 605 in FIG. 1).

Next, the structure of the packet processing unit 600 will be described with reference to FIG. 1. Referring to FIG. 1, the packet processing unit 600 includes: a transfer processing unit 504 for executing a packet transfer process; a memory 503 with a packet buffer for storing a packet; a route search processing unit 400 for searching a route by using header information in the packet stored in the memory 503; and a control circuit 502 for controlling the transfer processing unit 504 and communication control unit 501.

The route search processing unit 400 is constituted of a memory 300 for storing a routing table and a route search processing circuit 200 for searching the routing table and outputting the search result to the transfer processing unit 504.

Next, the operation of relaying a multicast packet to be executed by the packet processing unit 600 will be described. It is assumed that prior to the packet relaying process, the managing unit 601 distributes each multicast routing table to all packet processing units 600 connected to the switch 505 and each packet processing unit stores the routing table in the memory 300. The communication control unit 501 stores a multicast packet-received from the network 500 in the memory 503. The transfer processing unit 504 derives the packet header information from the packet data stored in the memory 503, and transfers it to the route search processing unit 400. The route search processing circuit 200 search the multicast routing table stored in the memory 300, by using the sender address and receiver multicast group address in the header of the received packet, and transfers N (N is an integer of 1 or larger) transmission port numbers as the search result to the transfer processing unit 504.

Upon reception of the search result, the transfer processing unit 504 rewrites the packet header of the packet stored in the memory 503, adds one of the N transmission port numbers to the packet, and transfers the packet to the switch 505. This operation is repeated N times by the transfer processing unit 504 to complete the transfer process for one received packet. If the transmission port number corresponds to the port number of the communication control unit connected to its own packet processing units, the packet is transmitted to the communication control unit connected to its own packet processing unit.

The switch 505 switches the packet transferred from the transfer processing unit 504 to each packet processing unit in accordance with the transmission port number added to the packet. The packet processing unit 600 received the switched packet transfers the packet to the communication control unit (501, 602, 603). The communication control unit generates the multicast MAC address from the receiver multicast address in the header of the packet, adds the receiver MAC address to the packet, and transmits the packet to each network.

In one aspect, the invention relates to a high speed operation of the route search processing unit 400. In the following, a first method to be executed by the route search processing unit 400 will be described. With this first method, the multicast routing table is structured as a two-branch tree and this two-branch tree structure is used for searching a route (hereinafter called a two-branch tree searching method). Then, a second method which is an improved version of the first method allowing a higher operation speed will be described. With this second method, the multicast routing table is structured as a p-th power-of-2-branch tree and this p-th power-of-2-branch tree structure is used for searching a route (hereinafter called a p-th power-of-2-branch tree searching method). In the description of the second method, a third method will also be described in which the number of tracing the nodes in the first and second methods is reduced by developing nodes having a mask length of m bits on a memory. Lastly, a hardware structure realizing the route search process applied to the second and third methods according to another embodiment will be described.

First, the two-branch tree searching method as the first method will be described.

As described in the related art, when a multicast route search is performed, the multicast routing table is searched by using as a search key the sender IP address and receiver multicast group address in the header of a received packet. Namely, with a combination of these two pieces of information, a route of a multicast packet from the sender to the receiver can be identified.

If the sender IP address and multicast group address are coupled and this couple is defined as a route address, a multicast routing table can be configured by using at its entry a pair of this route address and route information. In this case, the multicast routing table can be searched by using the route address as a search key.

Of the two addresses, the multicast group address is assigned one-to-one correspondence with the multicast group. Therefore, when the routing table is searched, a coincidence with the multicast group address in each entry is checked.

However, of the two addresses, the sender IP address uses as the search result the entry route information having the sender sub-network address in the entry coincident with the effective upper bits in the entry masked by a sub-network mask length. In this case, similar to the unicast route search, it is necessary to perform a longest coincidence search.

From the above reasons, the order of coupling the sender IP address and multicast group address is set so that the first is the multicast group address and the second is the sender IP address. This couple is defined as the route address, and the multicast routing table is structured as the two-branch tree structure in accordance with the bit pattern of the route address. In this case, similar to the unicast route search method using the Radish method described in the third related art, the longest coincidence search can be performed for the route address. In this case, because of the definition of the route address, the coincidence check can be performed for the multicast group address, and the longest coincidence search can be performed for the sender IP address.

Figure 5A:
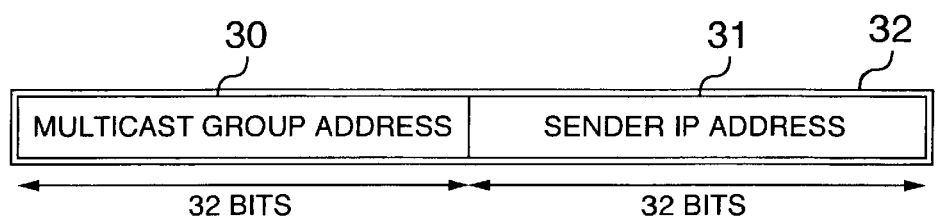
FIGS. 5a and 5b show the formats of a route address defined by the embodiment of the invention.
Figure 5B:
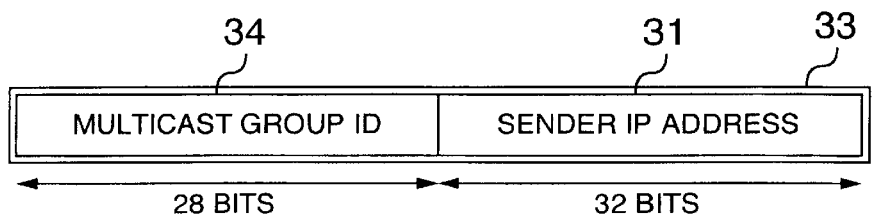

FIGS. 5a and 5b show route addresses to be used when a multicast routing table of the two-branch tree structure is searched. These route addresses are also applied to the p-th power-of-2-branch tree searching method to be described later. A route address shown in FIG. 5a is a couple of a multicast group address 30 and a sender IP address 31 and has 64 bits. A route address 33 shown in FIG. 5b is a couple of a multicast group ID 34 removing the upper four bits "1110" representative of the class D of the IP address from the multicast group address 30 and a sender IP address 31, and has 60 bits. The tree structure becomes shallower and the maximum number of loads to be traced during the search becomes smaller, the smaller the number of bits of a value (in this example, search address) constituting a tree structure Therefore, in the following description, the route address 33 shown in FIG. 5b having the smaller number of bits is used.

Next, a method of forming a multicast routing table of the two-branch tree structure by using the route addresses will be described. Since the concept of the tree structure does not rely upon the number of bits of the route address, it is assumed for the simplicity of the description that the multicast group ID has one bit and the sender IP address has two bits. In this case, the route address has three bits.

Figures 6, 7:
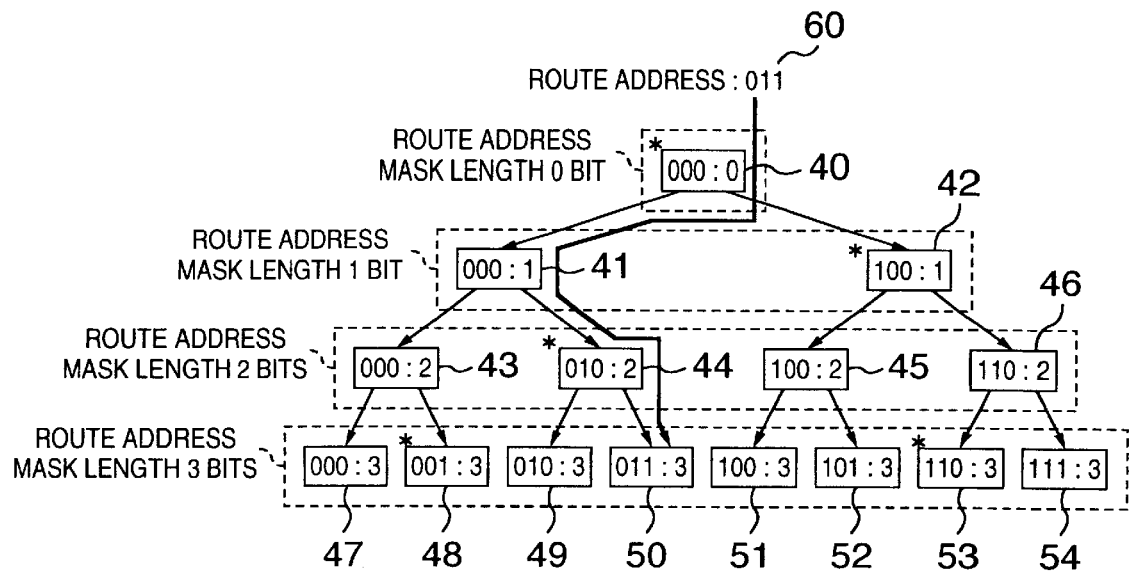
FIG. 6 shows a two-branch tree having a route address length of 3 bits, with all nodes being included.
FIG. 7 shows an example of a multicast routing table with a route address length of 3 bits.

FIG. 6 shows an example of the two-branch tree structure. As shown, each node has a route address "aaa" a route address mask length n, and pointers to two lower level nodes. The route address mask length indicates the number of effective upper bits of the route address of the node, and also indicates a check bit position of the route address in a packet received at the node. A pair of the route address and route address mask length is represented by a notation "aaa:n". A masked route address is represented by this notation.

Nodes of the tree are called a node with a route address length of 0 bit, a node with a route address length of 1 bit, a node with a route address length of 2 bits, a node with a route address length of 3 bits, in the order from the top to the bottom.

At a node 40 with the route address length of 0 bit, the 0-th bit of the route address indicated by the route address mask length is checked. The route is moved to the node (41, 42) with the route address length of 1 bit in accordance with the right/left pointer which is selected depending upon whether the value of the 0th bit is 0 or 1. At the node with the route address length of 1 bit, the route is moved to the node (43, 44, 45, 46) with the route address length of 2 bits in accordance with the right/left pointer which is selected depending upon whether the value of the first bit of the route address is 0 or 1. At the node with the route address length of 2 bits, the route is moved to the node (47, 48, 49, 50, 51, 52, 53, 54) with the route address length of 3 bits in accordance with the right/left pointer which is selected depending upon whether the value of the second bit of the route address is 0 or 1.

A route address is checked starting from the node 40 with the route address mask length of 0 bit, by tracing the tree in accordance with each pointer which is selected whether the-value of each bit is 0 or 1. The node having the route address length of 0 bit is traced even if the route address has any value. The node (41, 42) with the route address mask length of 1 bit is traced if the bits of a route address are "0xx" or "1xx" as viewed sequentially from the left to right. The node (43, 44, 45, 46) with the route address mask length of 2 bits is traced if the bits of a route address are "00x", "01x", "10x", or "11x" as viewed sequentially from the left to right. The node (47, 48, 49, 50, 51, 52, 53, 54) with the route address mask length of 3 bits is traced if the bits of a route address are "000", "001", "010", "011", "100", "101", "110" or "111" as viewed sequentially from the left to right. x means that the bit value may take either 0 or 1.

Therefore, the node 40 with the route address mask length of 0 bit is traced if the route address has a masked route address "000:0". The node (41, 42) with the route address mask length of 1 bit is traced if the route address has a masked route address "000:1" or "100"1". The node (43, 44, 45, 46) with the route address mask length of 2 bits is traced if the route address has a masked route address "000:2", "010:2", "100:2" or "110:2". The node (47, 48, 49, 50, 51, 52, 53, 54) with the route address mask length of 3 bits is traced if the route address has a masked route address "000:3", "001:3", . . . , or "111:3".

As described above, each node of the tree is one-to-one correspondence with each of all the masked route address having different route addresses and route address mask lengths.

In the two-branch tree, entries corresponding to the nodes 40, 48, 44, 42 and 53 are allocated to a multicast routing table shown in FIG. 7. More specifically, as will be later described with reference to FIGS. 12a and 12b, a flag indicating whether an entry is being assigned is provided in the data structure of each node. The value of the flag is set to "1" if an entry is assigned to the node, and transmission port information or a pointer to the transmission port information is stored in the node data structure. In this specification, a node affixed with * means that the node is being assigned an entry.

If the route address in a received packet is "011" (at 60 in FIG. 6), through a masked route address search following pointers of this tree to be selected depending upon whether each bit is 00 or 1, it is confirmed that the nodes 40 and 44 with "*" are coincident. If a plurality of entries of the routing table are coincident, the longest coincidence search is performed for the sender IP address. Therefore, the node having the longest route address mask length defined as above, i.e., the node 44 nearest to the tree end is selected from the coincident nodes 40 and 44 with "*", and the route information in the entry assigned to this node 44 is used as the search result of the routing table. In the example of the routing table shown in FIG. 7, the route information in the entry is omitted.

As seen from this search method, the search result does not affected even if the nodes 47, 49, 50, 51, 52, 54, and 45 which are not affixed with "*" and do not constitute an intermediate route to the node with "A", are removed from the tree. If the node at the tree end is not affixed with "*", the search can be completed without tracing the node to the tree end. If the nodes which are not affixed with "*" and do not constitute an intermediate route to the node with "*", are-removed from the tree, a tree shown in FIG. 8 is obtained.

Figures 8, 9:
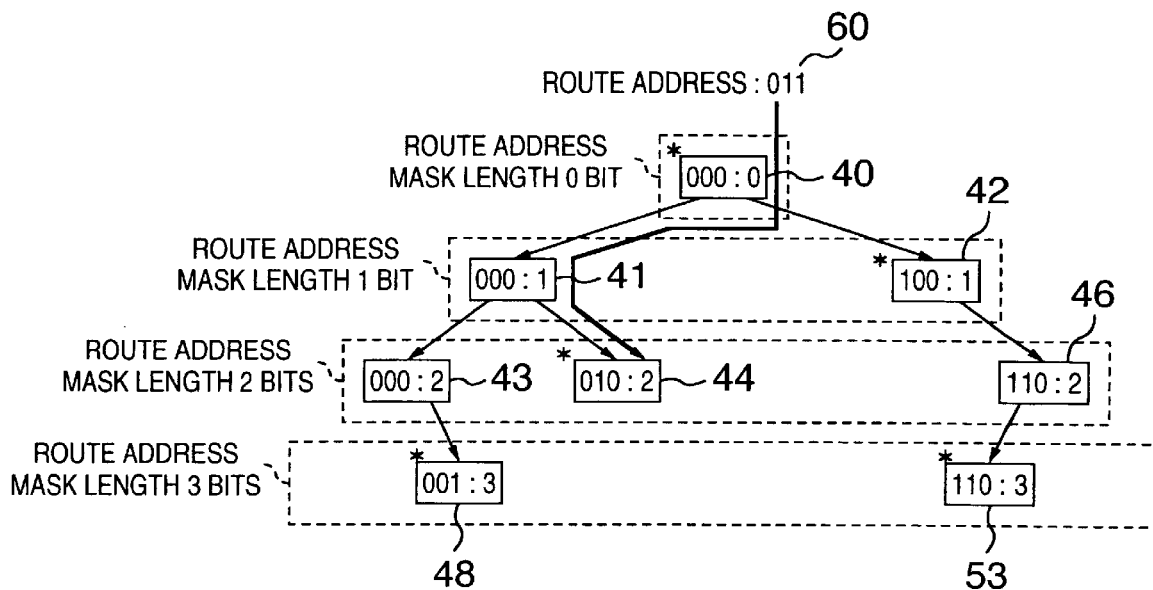
FIG. 8 shows an example of the tree shown in FIG. 6 from which the nodes are removed which are not assigned an entry and are not on an intermediate path to a node with an entry.
FIG. 9 shows an example of a multicast routing table with a route address of 32 bits.
Figure 10:
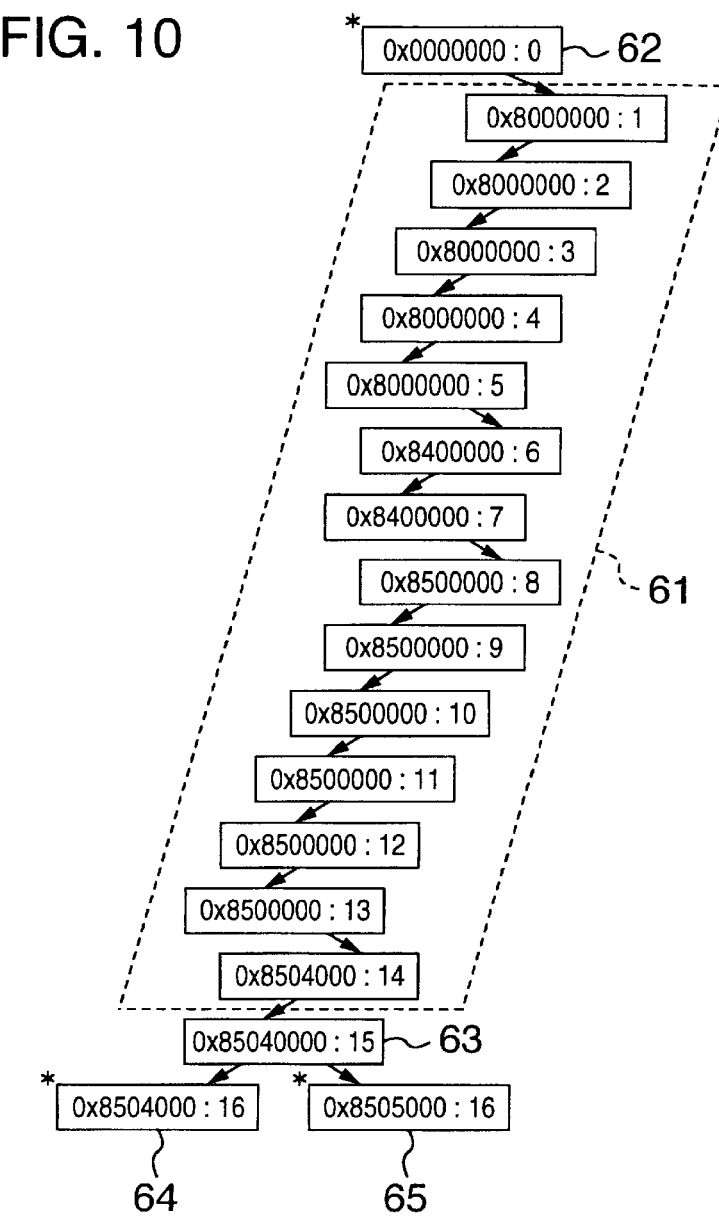
FIG. 10 shows a tree corresponding to the multicast routing table shown in FIG. 9.

Assuming that the route address length is 32 bits, a two-branch tree corresponding to a routing table shown in FIG. 9 is structured by using the above-described method. A long string 61 of nodes without any branch and "*" shown in FIG. 10 is therefore obtained. Similar to FIG. 7, the route information in the entry is omitted from the routing table shown in FIG. 9. A notation "0xNNNNNNNN" means "NNNNNNNN" is a hexadecimal number. In the above manner, the nodes having the next node connected only to one of the right/left pointers and not assigned with an entry are removed from the tree so that the number of nodes to be traced during the search can be reduced.

Figure 11:
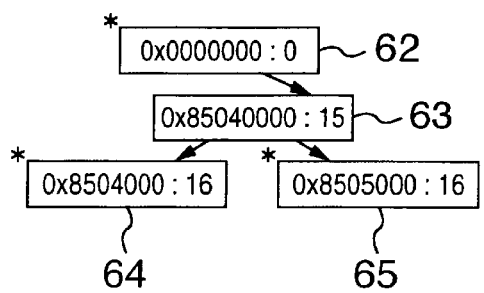
FIG. 11 is the tree shown in FIG. 10 from which the nodes are removed which have no branch and are not assigned an entry.

In the example shown in FIG. 10, the string 61 of nodes without any branch and "*" is removed and the node 63 just under the removed node train 61 is connected to the branch direction (right in FIG. 10) of the node 62 just above the removed node train 61. The resultant tree is as shown in FIG. 11. Removing the intermediate node train is hereinafter called a tree degeneration.

Next, a method of searching a degenerated two-branch tree will be described.

In the example shown in FIG. 11, after the 0-th bit is checked at the node 62 with the route address mark length of 0 bit, a node trace jumps to the node 63 with the route address mask length of 15 bits. Therefore, if the 15-th bit only is checked at the node 63 with the route address mask length of 15 bits, the intermediate bits, i.e., the first to 14-th bits cannot be checked. In order to check the first bit to 15-th bit by one process, a coincidence check is performed between the first to 15-th bits of the route address in a received packet and the first to 15-th bits of the route address 0x85040000 at the node 63. If the coincidence check indicates a coincidence, it means that the correct node is reached, i.e., that this node is reached even if each bit is checked by using a tree not degenerated. If the coincidence check does not indicate a coincidence, it means an incorrect node is reached, i.e., that there is no receiver node in a tree not degenerated.

In the example shown in FIG. 11, the 0-th bit is already checked and a branch is selected to have the same 0-th bit. Therefore, a coincidence is always retained. Generally, if it is checked at each node whether the node is a correct one or not, it can be guaranteed that the 0-th bit to the bit corresponding to the route address mask length of the route address in a received packet are coincident with those of the route address at the node. Therefore, when the next node is reached, irrespective of whether a coincidence check was performed to which bits, a coincidence check may be performed whether the 0-th bit to the bit corresponding to the route address mask length of the route address in a received packet are coincident with those of the route address at the node.

Next, the data structure of a node constituting the two-branch tree described above will be described with reference to FIGS. 12a and 12b. Referring to FIG. 12a, a next node mask length 0, 1 in words 110 and 110 is not the route address mask length of this node, but the route address mask length just under this node. Not its own route address mask length but the route address mask length just under the node is set in order to speed up the search. This will be later detailed with reference to FIGS. 20a and 20b. A flag 0, 1 field sets a flag (hereinafter called an entry flag) indicating whether this node has an entry, i.e., in the examples of the trees shown in FIGS. 6, 8, 10 and 11, indicating whether this node is affixed with "*", or a flag indicating an attribute of a packet coincident with this node. The flags 0 and 1 are set with the same value so that it is sufficient if either the word 110 or word 111 is read. A high speed operation to be achieved by not reading all data of the node but reading a portion of the data will be detailed later with reference to FIGS. 20a and 20b. A next node pointer 0, 1 in the words 110 and 111 is a pointer to the next node which is selected depending upon whether the value of the route address at a bit position indicated by the route address mask length of this node is 0 or 1. A route address in words 112 and 113 is a route address of this node. For example, the word 112 is set with upper 28 bits of the route address at this node, and the word 113 is set with lower 32 bits of the route address sat this node.

In the example shown in FIG. 12a, transmission port information 114 is stored in the data structure of the two-branch node. In the example shown in FIG. 12B, the transmission port information 114 is separated from the node structure of the two-branch tree node structure, and a pointer 115 to the separated transmission port information is stored. The transmission port information indicates one or a plurality of transmission port numbers from which ports a received multicast packet is transferred. The transmission port information requires several words if the number of ports of the router is large. Therefore, if the transmission port information 114 is stored in the two-branch tree node structure as shown in FIG. 12a, the size of the node structure becomes very different between the two-branch tree node assigned an entry and the two-branch tree node not assigned an entry. If the sizes of the nodes are different, the number of bits necessary to the next node pointer in the node increases and a process of calculating the real address of a memory from the pointer becomes complicated. The hardware structure in particular becomes complicated.

If the transmission port information is separated from the node and the pointer 115 to the transmission port information is stored in the node as shown in FIG. 12b, the size of the node becomes constant irrespective of whether an entry is assigned or not assigned, and the hardware structure can be simplified.

Next, the p-th power-of-2-branch tree searching method as the second method will be described.

With the two-branch tree searching method described above, one node has two branches and each bit of the route address is checked. The number of bits of a search key is equal to the number (maximum number) of nodes traced during the search. Therefore, the maximum search time is given by the following equation (1):

(maximum search time)=(process time at one node)×(the number of bits of a search key)         (1)

Namely, the maximum search time is proportional to the number of bits of a search key. It is desired to considerably shorten the maximum search time to speed up the search operation.

In the p-th power-of-2-branch tree searching method to be described hereinafter, one node has branches raised to the p-th power of 2 and every p bits are checked at the same time to shorten the search time by 1/p as compared to the related art. A node having branches raised to the p-th power of 2 is hereinafter called a p-th power-of-2-branch tree node.

A p-th power-of-2-branch tree node is formed by modifying a tree constituted of two-branch tree nodes described with the two-branch tree searching method. In a method of modifying a tree, one two-branch tree node having a route address mask length and lower level two-branch tree nodes having the route address mask length of (n+1) bits to (n+p−1) bits are used as one p-th power-of-2-branch tree node. This p-th power-of-2-branch tree node inherits the mask length n of the two-branch tree node at the top of the tree and n is defined as the mask length of the p-th power-of-2-branch tree node.

As an example of the modification method, a method of modifying a two-branch tree to an eight-branch tree will be described with reference to FIGS. 13a to 13c.

Consider now the case wherein the number of bits of a route address is 60 bits and an eight-branch tree is structured. In this case, a two-branch tree node to be used as an eight-branch tree node is selected by three different partition methods. One method (FIG. 13a) uses two-branch tree nodes having mask lengths of 0 to 2, 3 to 5, . . . , 57 to 59, and 60 bits 6 to 58, 59, respectively as one eight-branch tree node, another method (FIG. 13b) uses two-branch tree nodes having mask lengths of 1 to 3, 4 to 6, . . . , 55 to 57, and 58 to 60 bits, respectively as one eight-branch tree node, and the last method (FIG. 13c) uses two-branch tree nodes having mask lengths of 2 to 4, 5 to 7, . . . , 56 to 58, and 59 to 60 bits, respectively as one eight-branch tree node. Any one of these partition methods may be used. In order to facilitate addition and deletion of an entry of the tree, one of the three bit position partition methods is used.

Of the three bit position partition methods, in the case of the last two partition methods, the tree does not start from the mask length of 0 bits. Therefore, the 0-th bit check is required to be performed separately. For this check, a method (hereinafter called third method) of developing nodes having the mask bit length of m upon a memory at predetermined positions.

In the following the third method will be described. With the third embodiment, in the p-th power-of-2-branch tree structure, nodes having the mask length of m, irrespective whether or not there are such nodes, are developed in advance in a memory at predetermined positions, and when the route search starts, one of the developed nodes is selected and read from the memory, in accordance with the value of the upper m bits of the route address in a received packet. With this method, a search time for the upper m bits can be omitted.

Figure 13A:
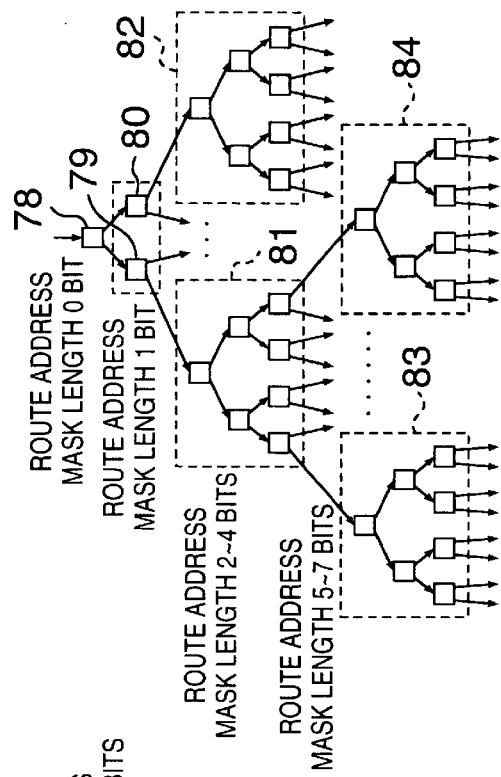
FIGS. 13a, 13b and 13c show two-branch tree nodes surrounded by broken lines which nodes are used as an eight-branch tree node.
Figure 13B:
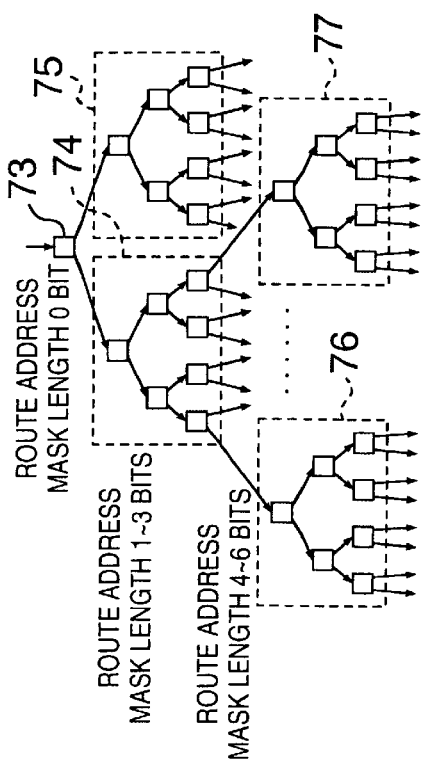
Figure 13C:
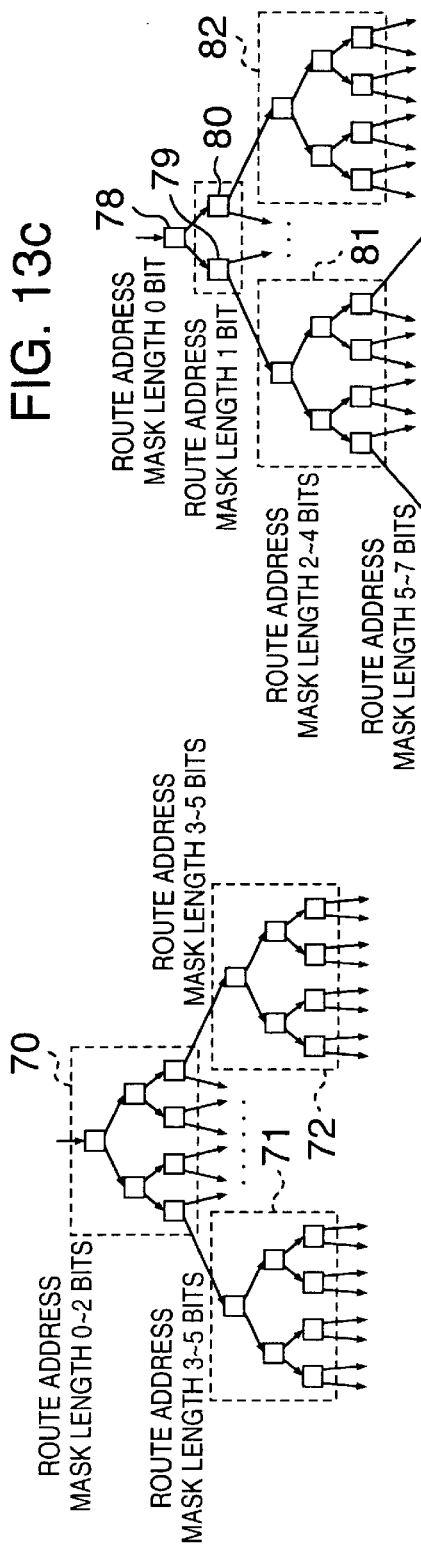
Figure 14A:
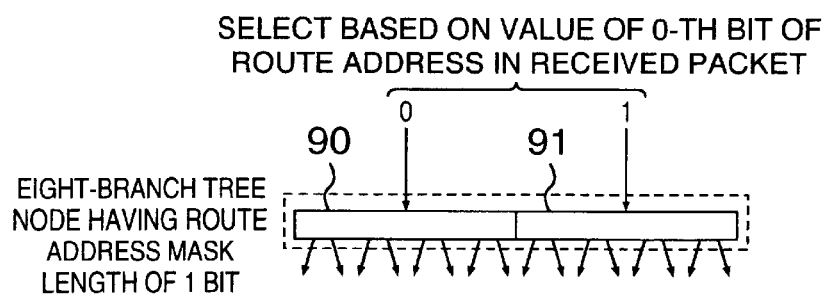
FIGS. 14a and 14b show trees which are partitioned at such a bit position that the mask length does not begin with 0 bit and the bits down to the partition position are searched by developing the first node or nodes on a memory.
Figure 14B:
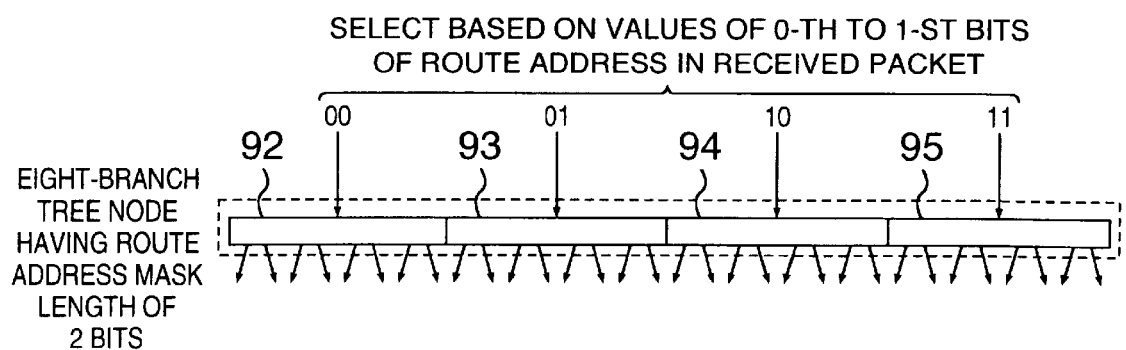

Application examples of the third method to the partition methods shown in FIGS. 13b and 13c are shown in FIGS. 14a and 14b.

In the structure shown in FIG. 14a, the first 0-th bit is checked by disposing the eight-branch tree nodes 90 and 91 having the mask length of 1 bit on the memory at predetermined positions and selecting them in accordance with whether the 0-th bit of the-route address in a reception packet is 0 or 1. In the structure shown in FIG. 14b, the 0-th and first bits are checked by disposing the eight-branch tree nodes 92, 93, 94 and 95 having the mask length of 2 bits on the memory at predetermined positions and selecting them in accordance with whether the 0-th and first bits are "00", "01", "10" or "11".

In the bit position partition methods shown in FIGS. 13a to 13c, the eight-branch nodes are disposed in the order of 1, 2 and 4. However, this order may be changed to an order multiplied by 8, i.e., the order of 8, 16, and 32, to an order multiplied by a value raised to the second power of 8, i.e., the order of 64, 128 and 256, or generally to an order multiplied by a value raised to the q-th power of 8, to thereby omit the search time for the first, second or generally q-th eight-branch tree nodes. In this case, the mask lengths m of the eight-branch tree node to be developed on the memory at predetermined positions are m=3×q, 1=3×q, and 2+3×q respectively for the bit position partition methods shown in FIGS. 13a to 13c, The search time for this upper m bits can be omitted. Methods of developing the eight-branch tree node on a memory is illustrated in FIGS. 15a to 15c, respectively for the three bit position partition methods shown in FIGS. 13a to 13c assuming that q=1, i.e., the search time for the first eight-branch tree nodes is omitted.

Figure 15A:
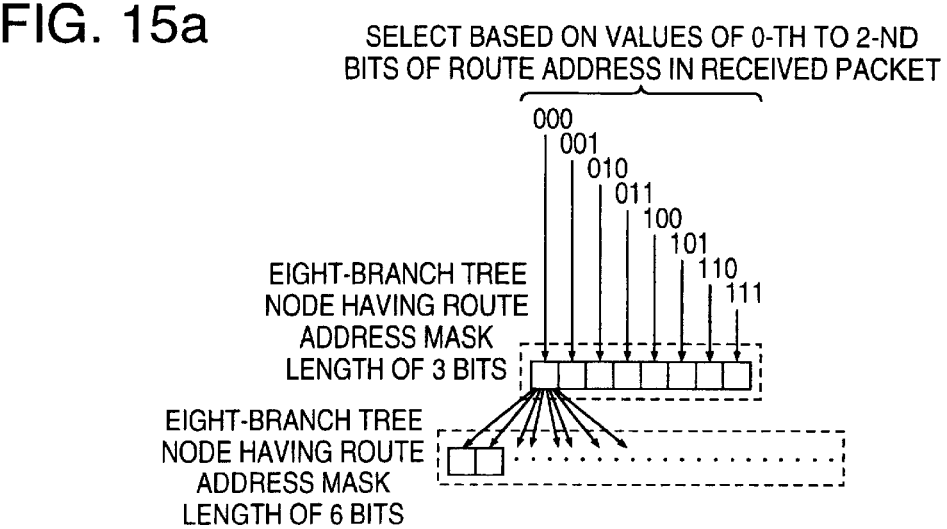
FIGS. 15a, 15b and 15c are trees which can omit the search time for bits of more first nodes.
Figure 15B:
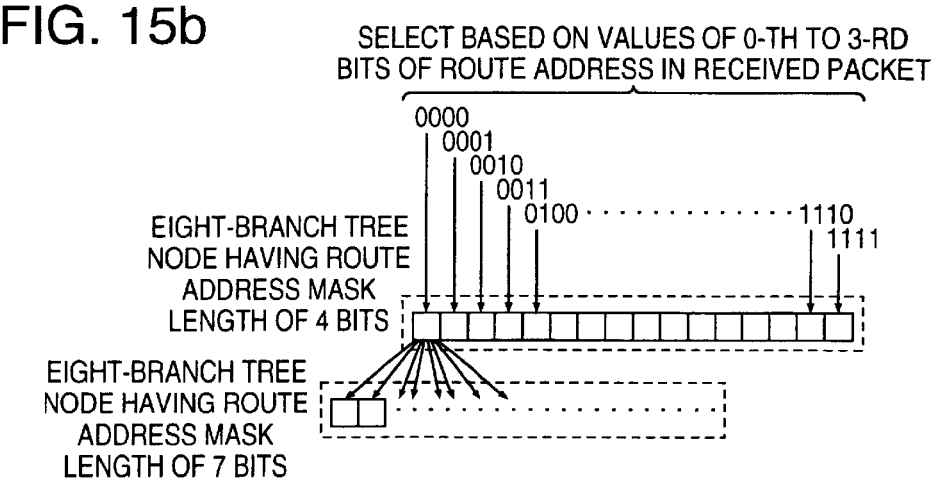
Figure 15C:
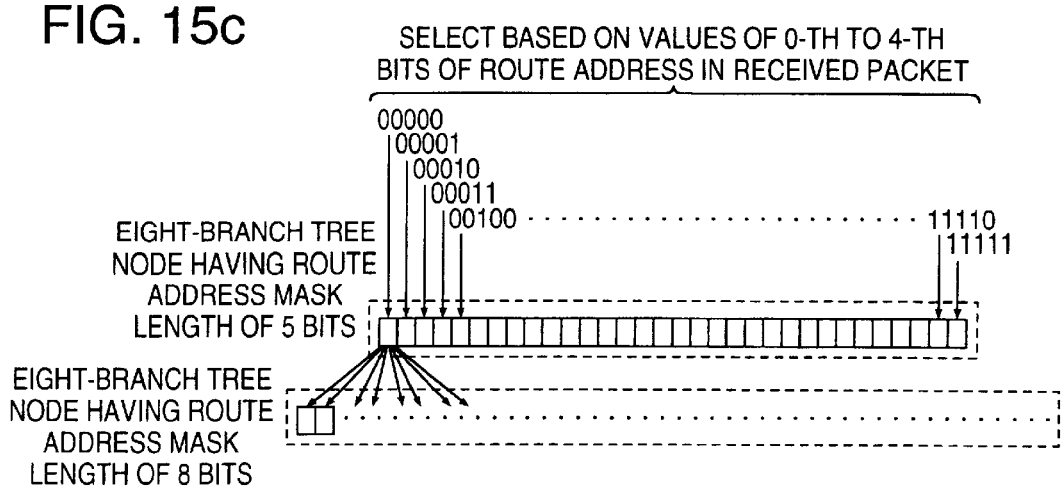

In FIG. 15a, eight eight-branch tree nodes having the mask length of m=3 are developed on the memory at predetermined positions, and one of the developed eight-branch tree nodes is selected in accordance with the three values of the 0-th to second bits of the route address in a received packet. In FIG. 15b, sixteen eight-branch tree nodes having the mask length of m=1+3=4 are developed on the memory at predetermined positions, and one of the developed eight-branch tree nodes is selected in accordance with the four values of the 0-th to third bits of the route address in a received packet. In FIG. 15c, thirty two eight-branch tree nodes having the mask length of m=2+3=5 are developed on the memory at predetermined positions, and one of the developed eight-branch tree nodes is selected in accordance with the five values of the 0-th to fourth bits of the route address in a received packet.

The third method has been described by taking as an example the eight-branch tree node. Similarly, the p-the power-of-2-branch tree nodes having a mask length of m bits are developed on the memory at predetermined positions to omit the search time of the higher m bits. If the value of p and q are made large, although the search time can be shortened, a large capacitor memory is required. Therefore, the values of p and q are determined from a tradeoff between a memory efficiency and a system performance.

The third method has been described by taking as an example the p-th power-of-2-branch tree node. Similarly, the third method may be applied to the first two-branch tree searching method.

Next, a method of structuring a four-branch tree node, an eight-branch tree node, and a sixteen-branch tree node, or generally a power-of-2-branch tree node will be described with reference to FIGS. 16a and 16b.

Figure 16A:
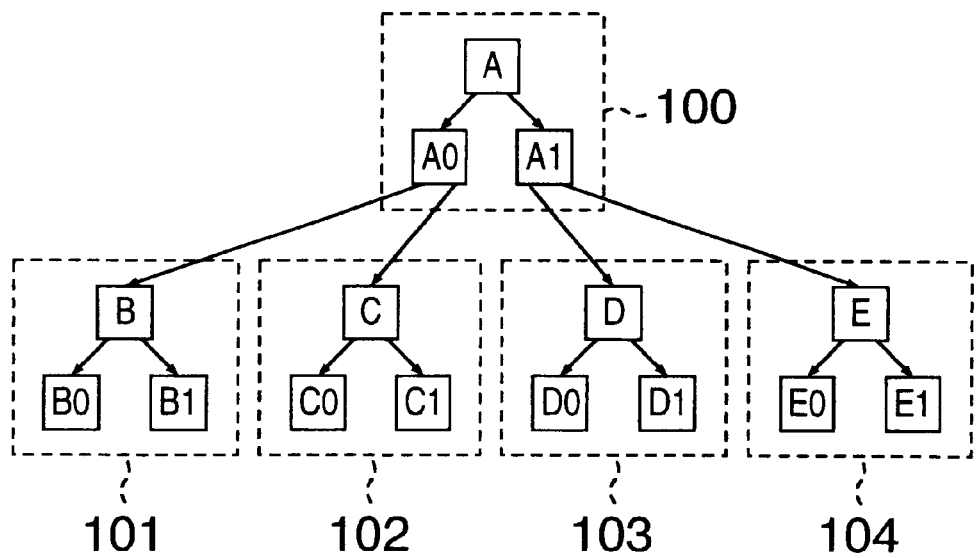
FIGS. 16a and 16b show trees when three two-branch tree nodes are reduced to two two-branch nodes to use them as a four-branch tree node.
Figure 16B:
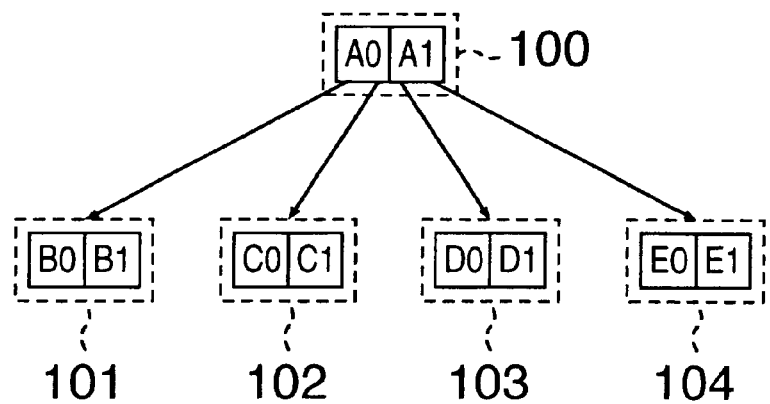

FIGS. 16a and 16b show four-branch tree nodes which are formed by collecting one of two-branch tree nodes A, B, C, D and E and two of two-branch tree nodes A0, A1, B0, B1, C0, C1, D0, D1, E0 and E1 just under the nodes A, B, C, D and E, three nodes in total, to form each of four-branch tree nodes 100, 101, 102, 103, and 104, and by disassembling three two-branch tree nodes to form the size of only lower two two-branch tree nodes. Disassemble is performed so as to satisfy the conditions that the same route search result is obtained both for the two-branch and four-branch tree nodes when the route search is performed in accordance with the specification of the longest coincidence search matching the route address mark length.

The disassemble for the four-branch tree is illustrated in FIGS. 17a to 17i. A notation *A represents route information in the entry assigned to the node A. A node without the notation *A means that the entry is not assigned to this node.

If the two-branch tree structure has all three nodes (FIG. 17a) and entries are assigned to all nodes, the upper node is deleted and route information *A0 and *A1 of the lower nodes is left. This is because the route information *A of the node A is not used because if the entry of the node A is coincident, one of the entries of the nodes A0 and A1 becomes always coincident and the longest coincidence search is performed.

If an entry is assigned to the upper node and an entry is not assigned to one (A1) of the lower nodes A0 and A1 (FIG. 17b), the route information *A of the node A is stored in the node A1. If the lower node A0 among the nodes A0 and A1 is not assigned an entry, the same operation is performed.

If an entry is not assigned to both the lower nodes A0 and A1 (FIG. 17c), the route information *A of the node A is stored in both the nodes A0 and A1.

If the lower node A1 is not present (FIG. 17d), the node A1 is added and the route information *A of the upper node A is stored in the node A. Since no node is connected below the node A1, a pointer to the node lower than the node A1 is set to NULL. The same operation is performed if the node A0 among the lower nodes A0 and A1 is not present.

If both the lower nodes A0 and A1 are not present (FIG. 17e), both the nodes are added. The route information *A of the node A is stored in both the lower nodes and a pointer to the nodes lower than the nodes A0 and A1 is set to NULL.

If an entry is not assigned to the upper node A (FIG. 17f), the node A is simply deleted.

If an entry is neither assigned to the upper node A nor to one (A1) of the lower nodes A0 and A1 (FIG. 17g), there is no route information in the node A1 of the four-branch tree. The same is applied if an entry is not applied to the node A0 among the lower nodes A0 and A1.

If an entry is neither assigned to the upper node A nor to both the lower nodes A0 and A1 (FIG. 17h), there is no route information in both the nodes A1 and A0 of the four-branch tree.

If there is only the lower node A0 (FIG. 17i), the lower node A1 is added. The same is applied if there is only the lower node A1.

Similarly, the eight-branch tree is formed by disassembling a collection of seven two-branch nodes to leave only the lowest four nodes. Two examples of disassembling the upper three two-branch tree nodes are illustrated in FIGS. 18a and 18b.

Figure 18A:
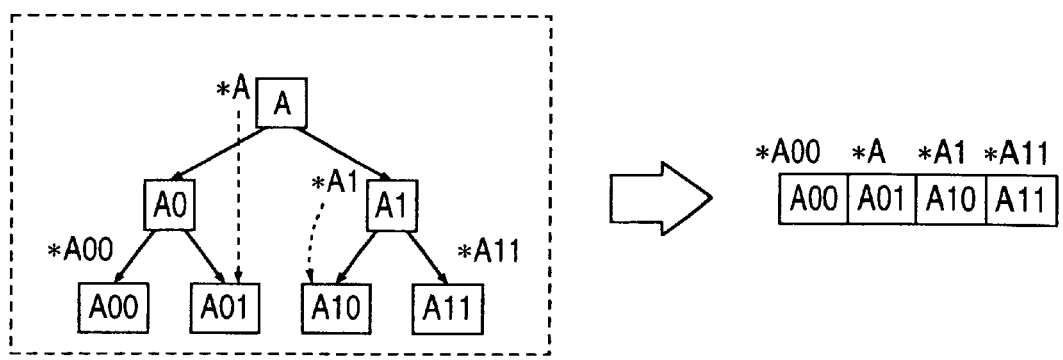
FIGS. 18a and 18b illustrate how seven two-branch tree nodes are reduced to four two-branch tree nodes to use them as an eight-branch tree node.

In the example shown in FIG. 18a, there are all seven two-branch tree nodes which are configured to one eight-branch tree node, and an entry is not assigned to some of the seven two-branch tree nodes. Of the lowest four nodes, the nodes A01 and A10 not assigned an entry store the route information *A and *A1 of the upper nodes (A and A1) having an entry node and positioned at the lowest position among all the upper nodes, i.e., having the longest route address mask length.

Figure 18B:
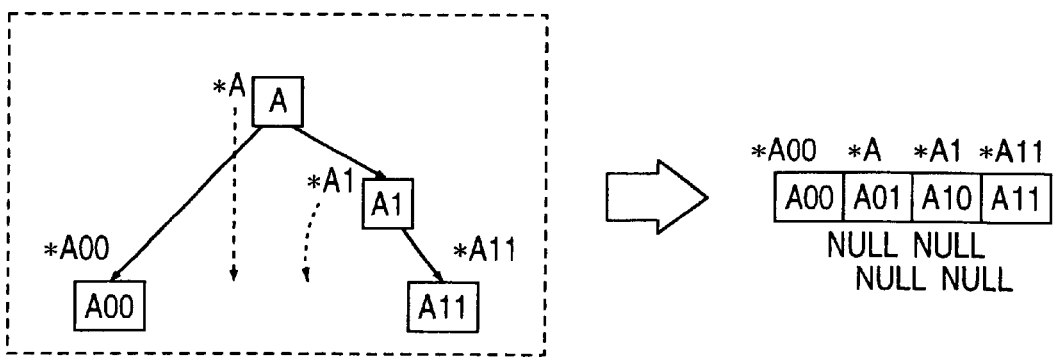

In the example shown in FIG. 18b, there are only some of the seven two-branch tree nodes which are configured to one eight-branch tree node. The nodes A01 and A10 not present are added without an entry and route information is stored therein following the rule described with FIG. 18a. Of the lowest four nodes A00, A01, A10, and A11, the added nodes A01 and A10 have no lower nodes so that a pointer to the lower node is set to NULL.

Similarly, a general p-th power-of-2-branch tree is formed by disassembling a collection of (p-th power of 2−1) two-branch nodes to leave only the lowest ((p−1)-th power of 2) nodes.

Collections of 2, 4, 8, . . . two-branch tree nodes are used for 4, 8, 16, . . . -branch tree nodes. It is therefore possible to use only one of common elements of two-branch tree nodes to be collected for the 4, 8, 16, . . . -branch tree nodes. The memory capacity for the 4, 8, 16, . . . -branch tree nodes can be reduced. One of common elements of two-branch tree nodes to be collected for the 4, 8, 16, . . . -branch tree nodes, includes a route address and a route address mask length at the node. As will be later described, since the route address mask length is not the route address mask length of the node itself, but the route address mask length of the node just under this node. Therefore, the effect of reducing the memory capacity cannot be obtained.

Next, the data structure of a four-branch tree node as one example of the p-th power-of-2-branch tree node will be described with reference to FIG. 19. A collection of two two-branch tree nodes is used to configure a four-branch tree node. In this case, only one piece of the data common to the two two-branch tree nodes is stored. The common data is only the route address at the node (words 124 and 125). If the sizes of the two two-branch tree nodes to be collected are different depending upon whether the route is assigned or not, the sizes of the four-branch tree nodes to be configured by respective two two-branch tree nodes are also different. Therefore, as shown in FIG. 12b, the transmission port information is separated from the node and this node stores a pointer to this transport information. Such two two-branch tree nodes are collected.

Figure 19:
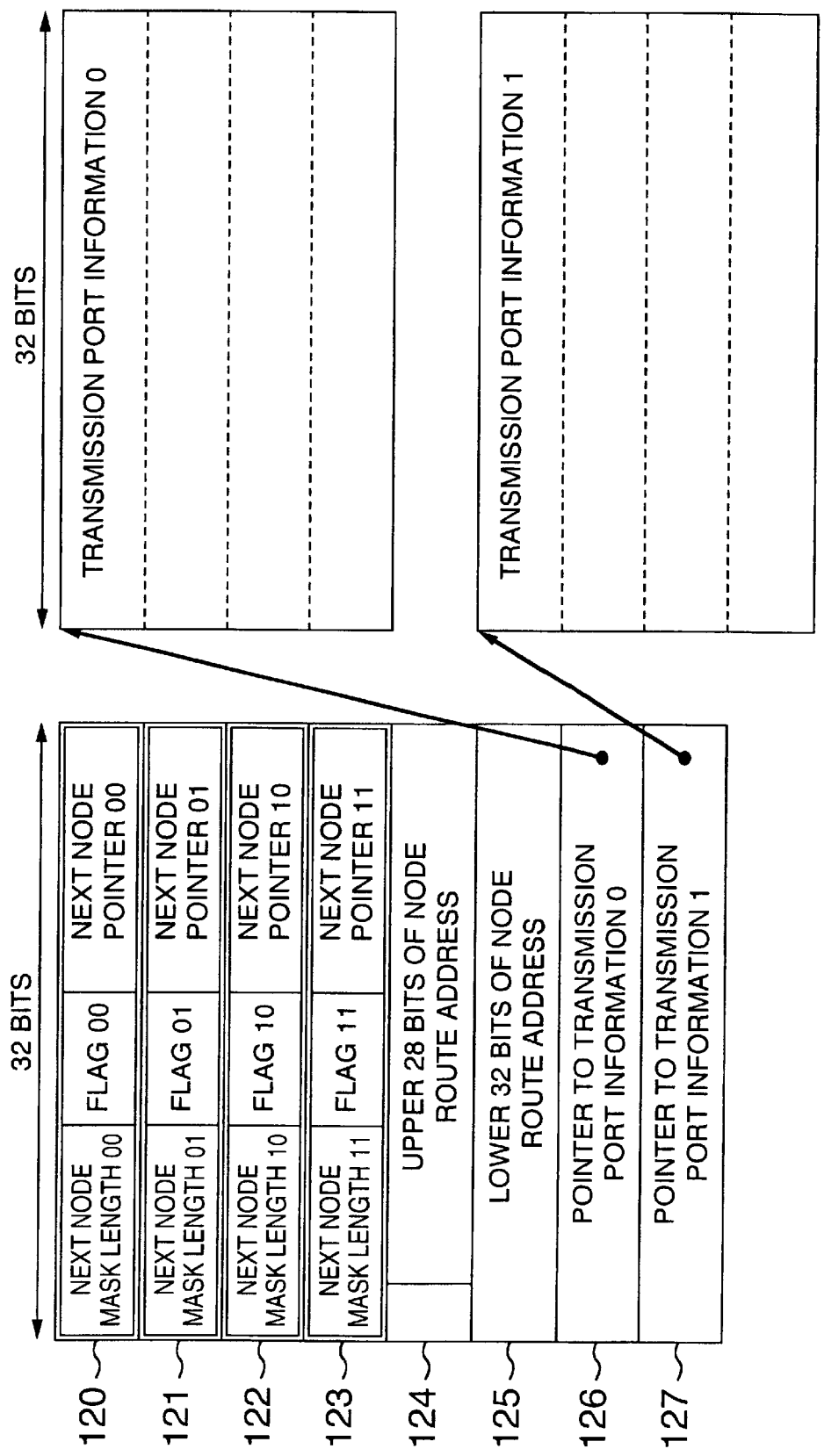
FIG. 19 shows the data structure of a four-branch tree node.

Referring to FIG. 19, a next node mask length tt, a flag tt and a next node pointer tt in words 120, 121, 122 and 123 are a value tt corresponding to the m-th and (m+1)-th bits where m if the route address mask length m of this node. The value tt may take 00, 01, 10, or 11. Similar to the two-branch tree, the flag 00 and flag 01 are set with the same value, and the flag 10 and flat 11 are also set with the same value.

In the example shown in FIG. 12b, the two-branch tree node has a data size slightly larger than 16 bytes corresponding to a power of 2. If a four-branch tree node is used which has only one route address, the data size is just 32 bytes corresponding to a power of 2. If an eight-branch tree node is used which has only one route address, the data size is smaller than 64 bytes with empty 4 bytes in which other information can be stored. If the number of two-branch tree nodes to be collected is increased (i.e., if the value p of the p-th power-of-2-branch tree node is increased), the data size of one node can be made smaller relative to the size corresponding to a power of 2.

By making the size of one node smaller than the size corresponding to a power of 2, the hardware structure can be made very simple. Examples of simplifying the hardware structure will be described.

In a first example, if a four-branch tree node has a data size smaller than 32 bytes, a memory area of one node does not ride over a bank boundary of a memory constituted of a plurality of banks. Even if a dynamic RAM is used as a memory, a memory area of one node does not ride over a row address boundary.

In a second example, if an address (hereinafter called a memory address) of each element in the node in a memory is to be calculated, an addition of a pointer to the node and an offset from the pointer is not performed, but the upper bits of the memory address are used as the value of the pointer and the lower bits thereof are used as the offset. For example, if a four-branch tree node has a data size smaller than 32 bytes, the memory address of an element in the node can be generated by assigning the (fifth power of 2)-th bit and higher bits of the memory address to the pointer to the node and assigning the (0-th power of 2)-th to (fourth power of 2)-th bits of the memory address to the offset to the element in the node.

In a third example, if a four-branch tree node has a data size smaller than 32 bytes, a value of (start byte address of the next node)/3 is stored as the next node pointer in the node. The data amount of 5 bits per one pointer can be reduced in one node.

Figure 1:
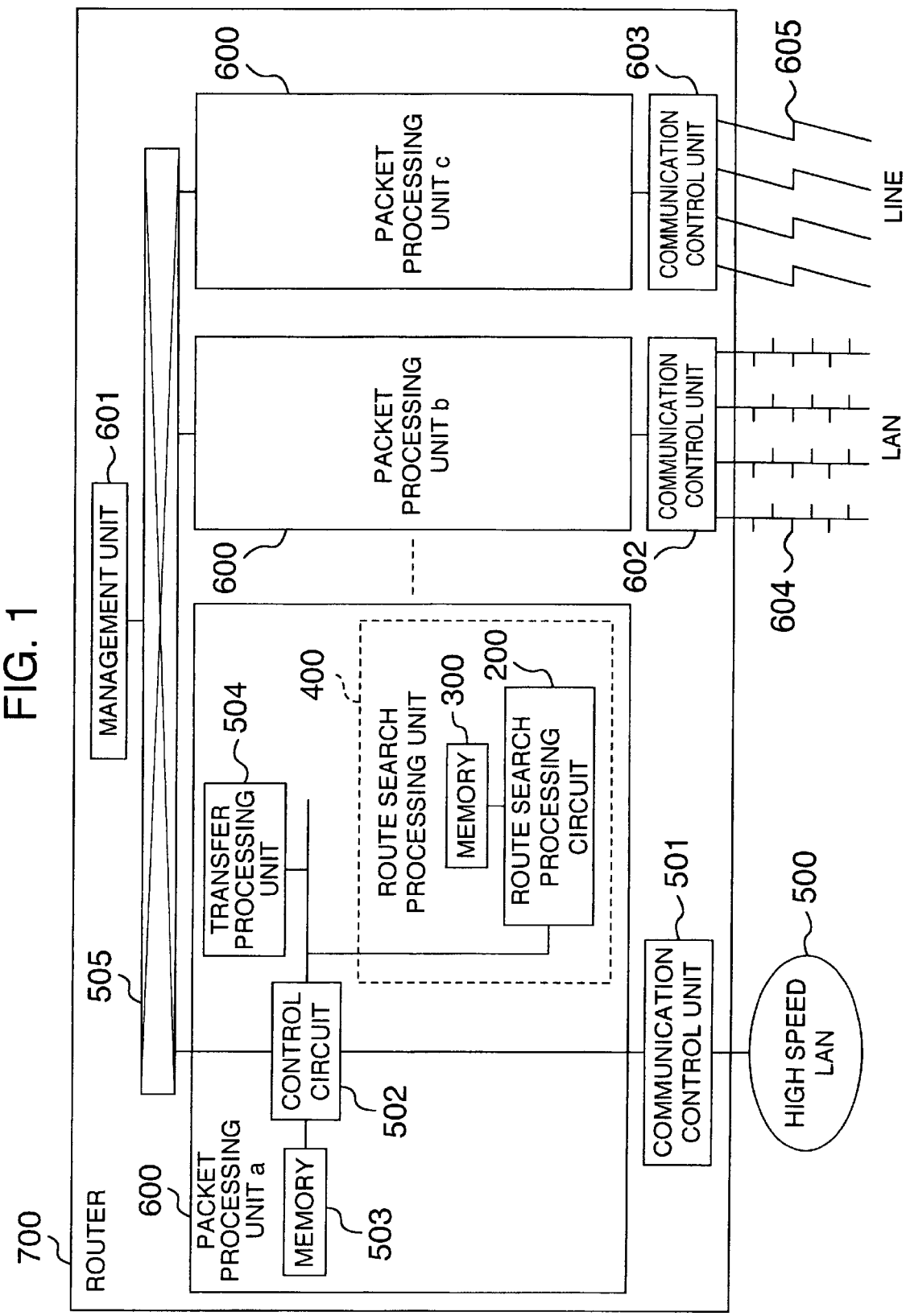
FIG. 1 is a block diagram of a router as an example of a packet relaying apparatus according to an embodiment of the invention.

Next, a method of reading a node wherein, for example, the route search processing circuit 200 shown in FIG. 1 is made of a customized LSI, will be described. If 4, 8, 16, . . . -branch tree nodes are used, the data size of each node is large. In this case, if all the data of one node is read from the memory storing the table into the customized LSI during the search process, a read time becomes longer as the node size becomes larger, resulting in a lowered performance. This problem can ba solved by reading only a portion of the node data without reading all the node data. This method will be described with reference to FIGS. 20a and 20b.

Figure 20A:
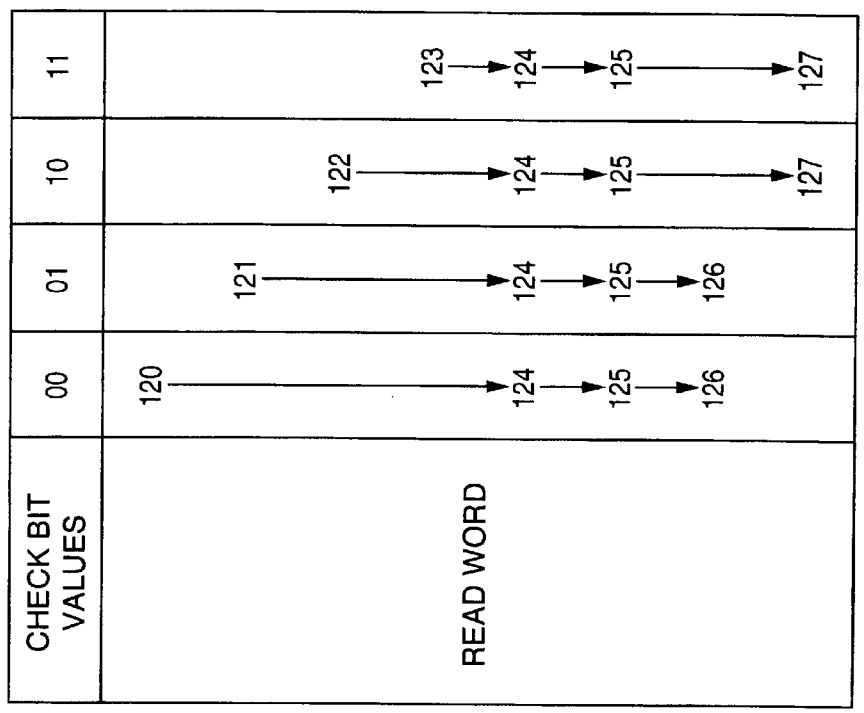
FIGS. 20a and 20b illustrate a method of reading a portion of node data without reading all the node data in order to prevent a node data read time from becoming long as the size of the node becomes large.
Figure 20B:
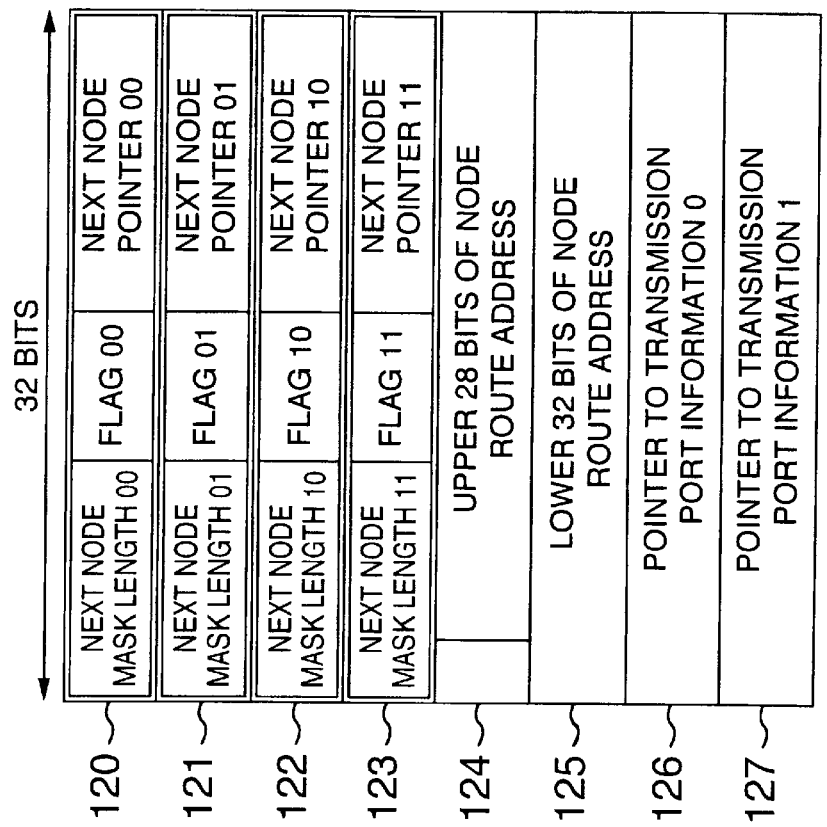

FIGS. 20a and 20b show the data structure of a four-branch tree node. As already described with reference to FIG. 19, the four-branch tree node having a route address mask length m is constituted of a two-branch tree node corresponding to the m-th bit of "0" of the route address and a two-branch tree node corresponding to the m-th bit of "1" of the route address, as shown in FIG. 12b. Therefore, in accordance with the value of the m-th bit of the route address in a received packet, only the corresponding two-branch tree node is read so that even if the size of the node becomes large, the data amount same as that of the two-branch tree node is read. In this case, the route address (words 124 and 125) as one element to be stored for a collection of two two-branch tree nodes shown in FIG. 19 is read irrespective of what value the m-th bit of the route address in a received packet takes.

In accordance with the value of the (m+1)-th bit of the route address in the received packet, one of the two next node pointers stored in the two-branch node is read to further reduce the read data amount.

This method may be applied also to the two-branch tree searching method. For example, if a two-branch tree node has a route address mask length m, only one of the two next node pointers is read in accordance with the value of the m-th bit of the route address in a received packet.

With these method described above, if a node has a route address mask length m, in accordance with the values 00, 01, 10 or 11 of the m-th and (m+1)-th bits of the route address, the data is read in the order of respectively (word 120→word 124→word 125→word 126), (word 121→word 124→word 125→word 126), (word 122→word 124→word 125→word 127), or (word 123→word 124→word 125→word 127) (FIG. 20b).

It is necessary to know the route address mask length m of a node in order to read only a portion of the node data. The route address mask length m of the node is required to be read at the start of reading the data of the node, or to move this information to the one-node preceding node and read it while the data of the preceding node is read. The method of reading the route address mask length m of the node at the start of reading the data of the node does not provide, however, good performance improvement effects of reading a portion of the node data. The reason for this is given in the following. For example, if the route search processing circuit 200 shown in FIG. 1 is made of a customized LSI, it takes a time to select and read the data after reading the route address mask length m starts, because of a gate delay in the customized LSI for deriving the m-th bit value from the route address and a memory read latency time taken to read data from the memory into the customized LSI after outputting a memory address of a read area to the memory. The method of moving data of the route address mask length m to the preceding node and reading it while the data of the preceding node is read, provides better performance improvement effects.

When the route address mask length m of the node is moved to the preceding node, the data of one node is read in the order of the next node route address mask length m, next node pointer, route address at the node, and then pointer to the transmission port information, so that a memory address of a data area to be first read from the next node can be calculated fastest.

The next node pointer indicates the top area of the memory area of the next node. The offset of the memory address from the top area of the next node to the data area to be first read can be obtained by reading the route address mask length m of the next node and checking the value of the corresponding bit position of the route address in a received packet.

Next, a method of shortening a read time to realize a high speed operation by not reading an element in one node which is not required to be read, in accordance with the specific conditions, will be described with reference to FIGS. 21*a* and 21*b*.

Figure 21A:
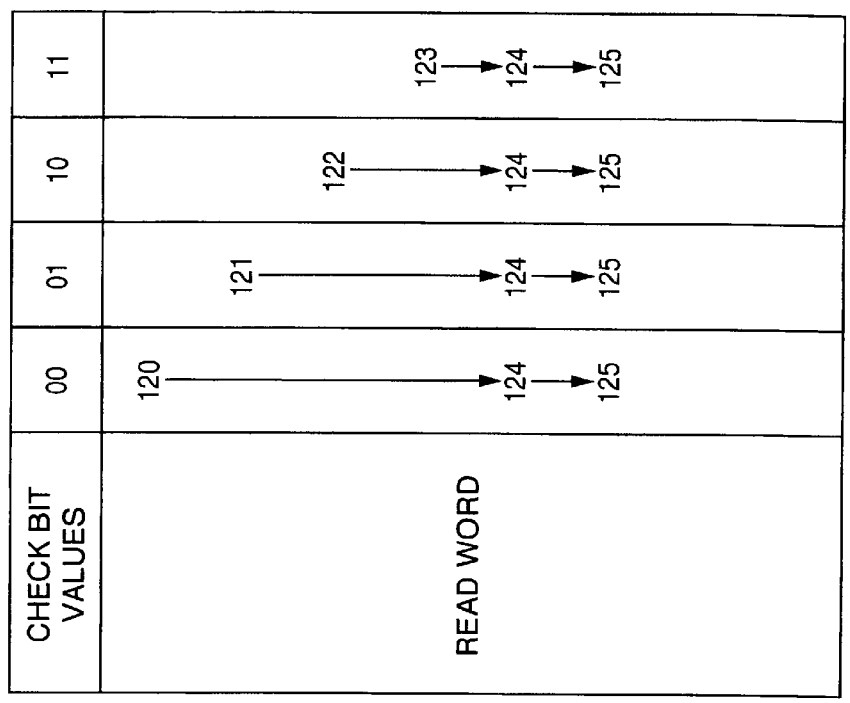
FIGS. 21a and 21b illustrate a method of speeding up a search by shortening a node data read time by not reading an element unnecessary to be read depending upon a specific condition.
Figure 21B:
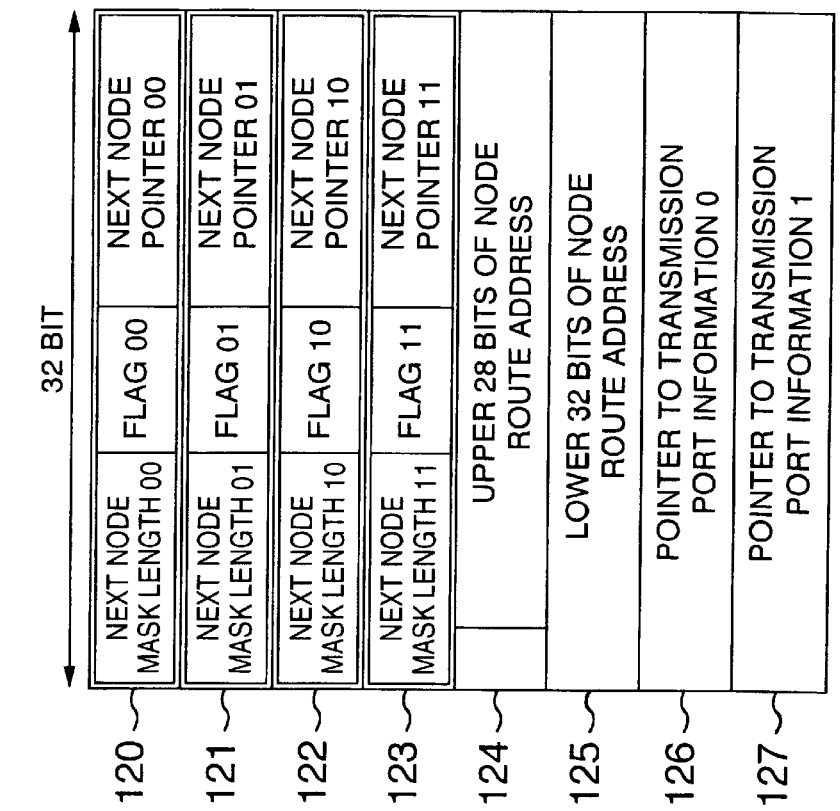

FIGS. 21*a* and 21*b* show the data structure of a four-branch tree. As described with the two-branch tree structure, in a general tree structure, an entry is not always assigned to all nodes. At a branch of the tree, it is necessary to provide a node even if an entry is not assigned. As shown in FIGS. 21*a* and 21*b*, in accordance with the values of the entry flags in the words 120, 121, 122, and 123 of the node data to be first read, the pointer to the transmission port information is not read if the node is not assigned an entry, to thereby shorten a read time. Since the entry flag can be expressed by 1 bit, an increase in the read time by reading this information is small.

With this method, if the node has a route address mask length m and the value of the m-th and (m+1)-th bits of the route address is 00, the word 120 is read, and-if it is judged from the flag 00 that the 0-th two-branch tree constituting the four-branch tree has no route information, only the words 124 and 125 are read. Only when it is judged that there is route information, the words 124, 125 and 126 are read in this order as shown in FIG. 21*b*. The same operation is also applied if the values of the m-th and (m+1)-th bits of the route address are 01, 10 and 11.

The two-branch tree searching method (first method), p-th power-of-2-branch searching method (second method) and method (third method) of developing a node having a route address mask length m have been described above. Next, the route searching operation to be executed by the route search processing circuit 200 shown in FIG. 1 will be described with reference to the flow chart shown in FIG. 22 which illustrates an operation by a combination of the second and third methods. In this example, in accordance with the values of the 0-th to (m−1)-th bits of a route address, one of p-th power-of-2-branch tree nodes developed on a memory at predetermined positions is selected. In the following, the p-th power-of-2-branch tree node selected and read first during the search is called a,first stage node.

The route address at the m-th bit to the last bit is checked by every p bits to check the p-th power-of-2-branch tree. It is assumed that the memory 300 shown in FIG. 1 stores the p-th power-of-2-branch tree node data in conformity with the second and third searching methods and transmission port information.

In the following, although a combination of the second and third methods is described, a combination of the first and third methods can also be realized by using the same flow chart. By using this flow chart, the route searching operation can be realized either by software or hardware. If it is to be realized by software, a CPU is used in place of the route search processing circuit 200 shown in FIG. 1. If it is realized by hardware, a customized LSI is used in place of the route search processing circuit 200 shown in FIG. 1.

A process 810 shown in FIG. 22 is a tree structure search process. A process 811 is a transmission port information process. First, the tree structure search process 810 will be described.

Upon reception of the receiver multicast group ID and a sender IP address in a received packet, the route search processing circuit 200 shown in FIG. 1 generates a route address described with reference to FIG. 5, from the received group ID and IP address. In accordance with the route address and the value of the mask length m of the first node, a pointer to the first node is generated. In accordance with the values (hereinafter called check bit value) of the m-th and (m+p−1)-th bits of the route address, a read address of the first node stored in the memory 300 is generated to read a portion of the first node data from the memory 300 (at 800 in FIG. 22).

Next, the route search processing circuit 200 shown in FIG. 1 compares the route address at the node with the upper effective bits of the route address in the received packet masked by the mask length (at 801 in FIG. 22). If they are not coincident, the tree structure search process is terminated (at 809 in FIG. 22), whereas if coincident, the flow advances to a process 802 shown in FIG. 22.

Next, the processes 802 and 803 shown in FIG. 22 will be described. These processes are an update process for route information in order to realize the longest coincidence search. The route information includes an entry flag and a pointer to the transmission port information among the node data output from the memory 300 shown in FIG. 1. The route search processing circuit 200 shown in FIG. 1 checks the entry flag in the node data. Only if the entry flag is "1" (at 812 in FIG. 22), new route information in the read node data is loaded in a register (at 803 in FIG. 22), whereas if the entry flag is "0", the update process is not performed (at 813 in FIG. 22).

Next, the route search processing circuit 200 shown in FIG. 1 judges whether the next node pointer in the node data output from the memory 300 shown in FIG. 1 is NULL (at 804 in FIG. 22). If NULL, the tree search process 810 is terminated, whereas if not NULL, a read address of the first node data stored in the memory 300 is generated in accordance with the pointer and the new check bit values, to thereby read the node data from the memory 300 (at 805 in FIG. 22).

The above processes are repeated to perform the p-th power-of-2-branch tree search.

Next, the transmission port information process 811 shown in FIG. 22 will be described. As the result of the tree structure search process, the register of the route search processing circuit 200 shown in FIG. 1 has as the route information, the entry flag and the pointer to the transmission port information. The route search processing circuit 200 shown in FIG. 1 first checks the entry flag loaded in the register (at 806 in FIG. 22). If the entry flag value is "0", the route search process is terminated and a notice of no search result is supplied to the transfer processing unit 504. If the entry flag value is "1", it means that the search result shows a coincidence of a certain entry. In this case, therefore, by using the pointer to the transmission port information, the transmission port information is read from the memory 300 (at 807 in FIG. 22). By using this transmission port information, one or a plurality of port numbers for packet transmission are generated and supplied to the transfer processing unit 504 shown in FIG. 1 (at 808 in FIG. 22). After all the port numbers are transmitted, the route search process is terminated.

Next, the hardware structure according to an embodiment of the invention will be described with reference to FIGS. 23 and 24, which hardware structure realizes the searching method described with reference to FIG. 22.

Figure 23:
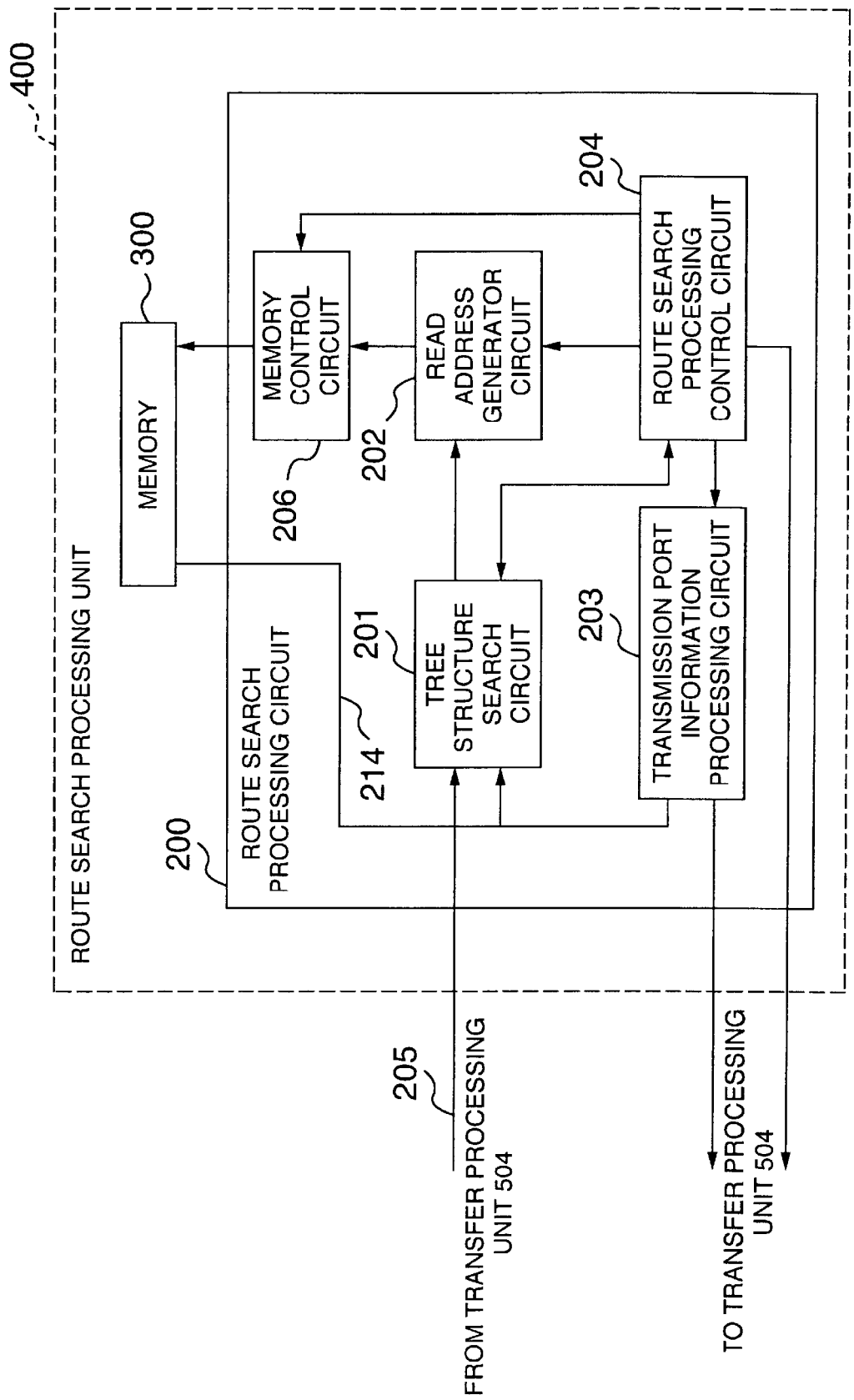
FIG. 23 is a block diagram of the route search processing unit according to an embodiment of the invention.
Figure 24:
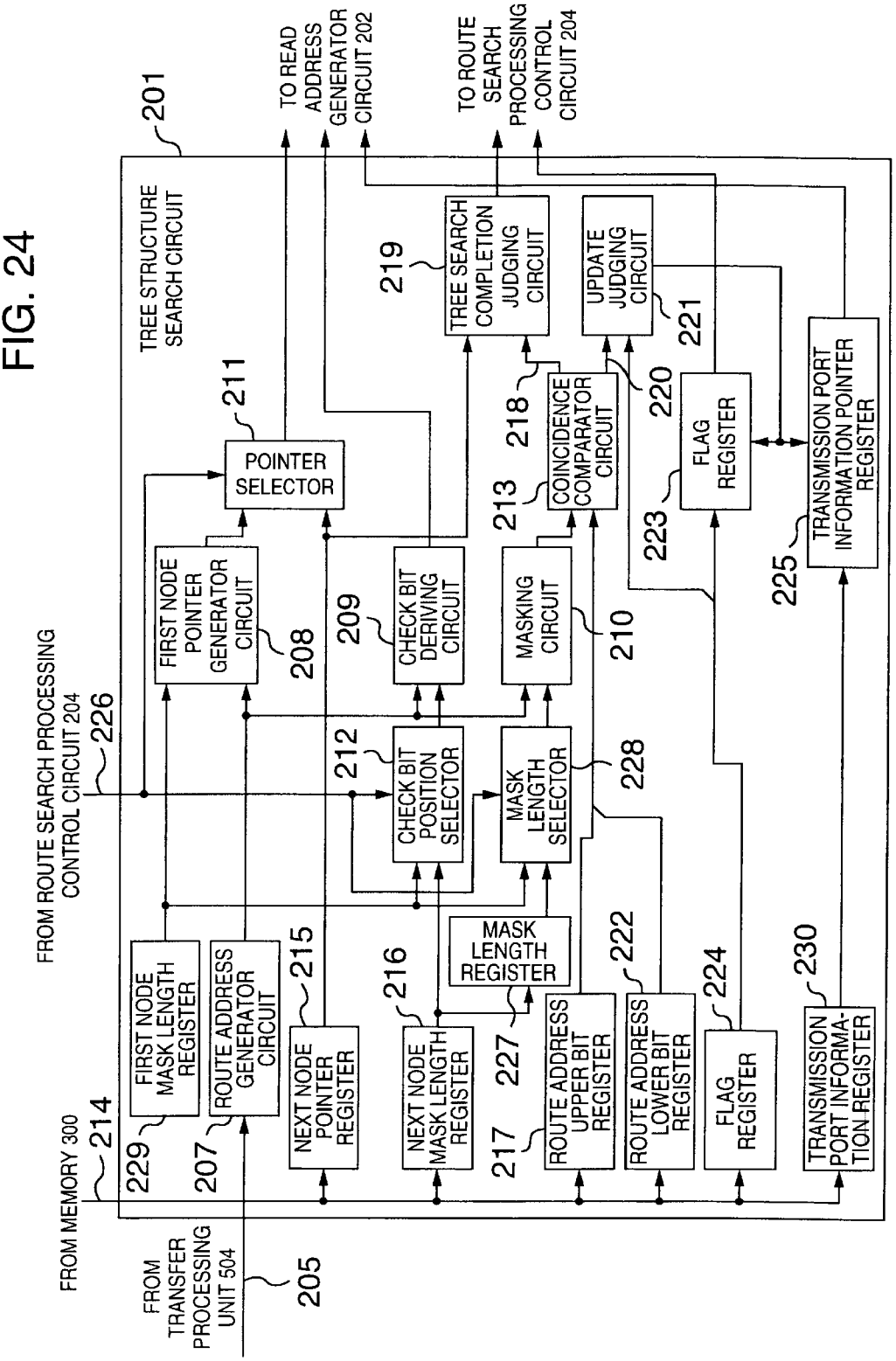
FIG. 24 is a block diagram of a tree structure search processing circuit for searching a multicast routing table of a tree structure according to an embodiment of the invention.

FIG. 23 shows an example of the hardware structure realizing the route search processing unit 400. The route search processing circuit 200 includes a tree structure search circuit 201, a read address generator circuit 202, a memory control circuit 206, a transmission port information processing circuit 203 and a route search processing control circuit 204.

The tree structure search circuit 201 searches the p-th power-of-2-branch tree structure stored in the memory 300 to generate the next node pointer, derive the check bit values from the route address in a received packet, judge the completion of the tree structure search, and update the candidate of the route information as the search result. During the tree structure search process, the read address generator circuit 202 generates a memory address of a word to be read in the node in the sequential order descried with FIGS. 20a and 20b, in accordance with the next node pointer and check bit values output from the tree structure search circuit 201 and a timing signal output from the route search processing control circuit 204. The read address generator circuit 202 supplies the generated memory address to the memory control circuit 206. During the transmission port information processing, the read address generator circuit 202 generates a memory address of the transmission port information by using the pointer to the transmission port information loaded in a register of the tree structure search circuit 201 as the search result.

The memory control circuit 206 generates a memory control signal in accordance with the supplied memory address and the timing signal output from the route search processing control circuit 204. The transmission port information processing circuit 203 generates one or a plurality of port numbers for packet transmission by using the transmission port information read from the memory 300, and transmits the port numbers to the transfer processing unit 504. The route search processing control circuit 204 controls the whole of the route search processing circuit 200, such as an operation timing and operation status management of each circuit.

If the route search processing circuit 200 is made of a customized LSI, the memory 300 may be provided directly from the customized LSI or may use a built-in memory of the customized LSI. As compared to the discrete memory, the built-in memory of the customized LSI has a shorter memory access time so that the search process for the routing table stored in the memory 300 can be performed at high speed.

Next, the operation of the route search processing unit 400 will be described with reference to FIG. 23. The detailed operation of the tree structure search circuit 201 will be described later with reference to FIG. 24.

Upon reception of the receiver multicast group ID and a sender IP address in a received packet from the transfer processing unit 504, the tree structure search circuit 201 generates a route address from the received group ID and IP address. In accordance with the route address and the value of the mask length m of the node, a next node pointer is generated and transferred to the read address generator circuit 202. The tree structure search circuit 201 derives the values (check bit values) of the check bit positions of the route address indicated by the node mask length, and transfers the values to the read address generator circuit 202.

The read address generator circuit 202 generates a memory address of a word to be read in the node in the sequential order descried with FIGS. 20a and 20b, in accordance with the next node pointer and check bit values and a timing signal output from the route search processing control circuit 204, and transmits the generated memory address to the memory control circuit 206. The memory control circuit 206 generates a memory control signal by using the memory address and a timing signal supplied from the route search processing control circuit, and outputs the memory control signal to the memory 300. Upon reception of the memory control signal, the memory 300 transfers the corresponding node data to the tree structure search circuit via a signal line 214.

By using this node data, the tree structure search circuit 200 performs the processes 801, 802, 803, 804 and 805 shown in FIG. 22. The details of these processes will be given later with reference to FIG. 24. If the judgement process corresponding to the processes 801 and 804 shown in FIG. 22 judges that the tree structure search is completed, a tree structure search completion signal is supplied to the route search processing control circuit 204 which starts a transmission port information read process. If it is not judged as a tree structure search completion, the processes 801, 802, 803, 804 and 805 shown in FIG. 22 are repeated until the tree structure search completion.

Next, the route search processing control circuit 204 checks the entry flag in the rout information (entry flag, pointer to transmission port information) stored in the tree structure search circuit 201. If the entry flag is "0", the route search process is terminated and a notice of no search result is supplied to the transfer processing unit 504. If the entry flag is "1", a transmission port information read and transmission port generation control process starts and the tree structure search circuit 201 is controlled to output the pointer to the transmission port information to the read address generator circuit 202. By using the pointer to the transmission port information and a timing signal output from the route search processing circuit 204, the read address generator circuit 204 generates a memory address of the transmission port information to be read, and transmits the generated memory address to the memory control circuit 206. In accordance with the memory address and a timing signal output from the route search processing control circuit 204, the memory control circuit 206 generates a memory control signal and transmits it to the memory 300. Upon reception of this control signal, the memory 300 outputs the transmission port information to the signal line 214. Upon reception of this transmission port information, the transmission port information processing circuit 203 generates one or a plurality of port numbers for packet transmission and transmits the port numbers to the transfer processing unit 504.

The structure of transmission port information may be a list structure which interconnects a plurality of transmission port numbers by pointers or a bitmap of transmission port numbers. If the list structure is used, the number of memory accesses increases as the number of transmission port numbers increases, so that the search process takes a time. A bit map of transmission port numbers can be burst-read from the memory 300 and stored in the transmission port information processing circuit 203. Then, the bit map is decoded to generate the transmission port numbers. In this case, the number of memory accesses can be reduced.

After all the transmission port numbers are output, the route search processing control circuit 204 terminates the route search process and controls the next packet.

Next, the details of the tree structure search circuit 201 shown in FIG. 23 will be given with reference to FIG. 24.

First, a process corresponding to the first node read process 800 and next node read process 805 shown in FIG. 22 will be described with reference to FIG. 24. The receiver multicast group address and sender IP address transmitted via a signal line 205 from the transfer processing unit 504 are stored in a route address generator circuit 207. In accordance with this information, the route address generator circuit 207 generates a route address 33 of 60 bits described with reference to FIG. 5b and outputs it to a first node pointer generator circuit 208, a check bit deriving circuit 209 and a masking circuit 210.

By referring to the value m set to a first node mask length register 229, the first node pointer generator circuit 208 derives the values from the 0-th bit to the (m−1)-th bits of the route address in a received packet, and in accordance with these m-bit values, generates the first node pointer to output it to a pointer selector 211. In accordance with either a start node read select signal or an other-node read select signal supplied via a signal line 226 from the route search processing control circuit 204 shown in FIG. 23, the pointer selector 211 selects the first node pointer for reading the first node data and outputs it to the read address generator circuit 202 shown in FIG. 23. For reading the other-node data, the pointer selector 211 selects the next node pointer loaded in a next node pointer register 215 and outputs it to the read address generator circuit 202.

In parallel to the above-described process, the check bit deriving circuit 209 refers to the value m selected by the check bit position selector 212 and set in the first stage node mark register 229 and derives p-bit check bits from the m-th bit to the (m+P−1)-th bits of the route address and outputs them to the read address generator circuit 202 shown in FIG. 23, for the start node read. For the other-node read, the next node mask length ml loaded in a next node mask length register 216 to be later described is selected by the check bit position selector 212 and output to the check bit deriving circuit 209. In accordance with the next node mask length ml, the check bit deriving circuit 209 derives p-bit check bits from the ml-th bit to the (ml+p−1)-th bit of the route address, and outputs them to the read address generator circuit 202 shown in FIG. 23.

The read address generator circuit 202 and memory control circuit 206 shown in FIG. 23 generate a memory address of a word in the node to be read and a memory control signal in the sequential order described with reference to FIGS. 20a and 20b by using the node pointer and p-bit check bits, and the memory 300 reads the word of the node at the supplied memory address and outputs it to the signal line 214.

If the bit width of the signal line 214 is 32 bits, the number of words per one node read (partial read) is four words if the method described with FIGS. 20a and 20b is adopted. The data of four words is output to the signal line 214 in the order shown in FIGS. 20a and 20b and loaded in respective registers (next node pointer register 215, next node mask length register 216, route address upper register 217, route address lower register 222, flag register 224, and transmission port information pointer register 230). A load timing of each register is controlled by a control signal. (not shown) supplied from the route search processing control circuit 204. The next node pointer register 215 stores the next node pointer, the next node mask length register 216 stores the next node mask length, the route address upper register 217 stores the upper 28 bits of the route address at the node, the route address lower register 222 stores the lower 32 bits of the route address, the flag register 224 stores the entry flag, and the transmission port information pointer register 230 stores a pointer to the transmission port information.

Next, a process corresponding to the route address coincidence comparison circuit 801-will be described with reference to FIG. 24. When the first node data is read, the value set in the first node mask length register 229 is input via the mask length selector 228 to the masking circuit 210.

When the other-node data is read, the node mask length loaded in the mask length register 227 is input via the mask length selector 228 to the masking circuit 210. A value of the mask length register 227 is a value of the next node mask length stored in the one-node preceding node data and loaded in the next node mask length register 216. A value in the next node mask length register 216 is updated each time the node data is read. Therefore, before it is updated, a mask length of a presently read node (hereinafter called present node) data to be used for the route address coincidence comparison process is loaded in the mask length register 227.

The masking circuit 210 generates a mask which validates the upper bits corresponding to the mask length. The masking circuit calculates a logical product of this mask and the route address in a received packet output from the route address generator circuit 207, and outputs the logical products (hereinafter called a masked route address in the received packet) to a coincidence comparator circuit 213. The upper 28 bits and lower 32 bits of the route address at the node stored in the route address upper register 217 and route address lower register 222 are coupled in this order and input to the coincidence comparator circuit 213 as the route address at the node. The coincidence comparator circuit. 213 compares the route address at the node with the masked route address in the received packet (hereinafter called a route address comparison). If the comparison result indicates incoincidence, an incoincidence signal is transferred via a signal line 218 to a tree search completion judging circuit 219. Upon reception of the incoincidence signal, the tree search completion judging circuit 219 transmits a tree structure search completion signal to the route search processing control circuit 204 shown in FIG. 23.

The value in the mask length register 227 is updated by the value of the next node mask length stored in the next node mask length register 216, the updated value being used for the route address comparison when the next node data is read.

Next, a process corresponding to the processes 802 and 803 shown in FIG. 22 will be described with reference to FIG. 24.

If the route address comparison by the coincidence comparator circuit 213 indicates a coincidence, the coincidence comparator circuit 213 outputs a coincidence signal to an update judging circuit 221 via a signal line 220. Only when this coincidence signal is input to the update judging circuit 221 and the entry flag value stored in the flag register 224 is "1" (at 812 in FIG. 22), the update judging circuit 221 outputs an update signal to the flag register 223 and transmission port information pointer register 225. Upon reception of the update signal, the flag register 223 stores the new entry flag stored in the flag register 224. Similarly, upon reception of the update signal, the transmission port information pointer register 225 stores the new transmission port information pointer register stored in the transmission port information pointer register 230 (the route information updating process 803 in FIG. 22). If the value of the entry flag is "0", the update judging circuit 221 does not transmit the update signal so that the update process is not performed by the flag register 223 and transmission port information pointer register 225 (at 813 in FIG. 22).

If information other than the flag and transmission port information pointer is necessary to be added as the route information, such information is added to the node data of the tree structure, and registers for storing and updating such information are newly added.

Next, a process corresponding to the judgement process 804 shown in FIG. 22 for judging whether the next node pointer is NULL will be described with reference to FIG. 24. The next node pointer stored in the next node pointer register 215 is input to the tree search completion judging circuit 219. If the next node pointer is NULL, the tree search completion judging circuit 219 outputs a tree search completion signal to the route search processing control circuit 204 shown in FIG. 23.

The detailed operation of the tree structure search processing circuit 201 shown in FIG. 23 has been described with reference to FIG. 24. Since the tree structure search processing circuit 201 is realized by the hardware structure, each of the processes 801, 802, 803, 804 and 805 in the tree structure search operation shown in FIG. 22 is not required to be executed-time sequentially, but each process can start after data necessary for each process is stored in each of the registers 215, 216, 217, 222, 224 and 223. By executing each process in parallel, the tree structure can be searched at high speed.

The receiver multicast group address and sender IP address used for a search key for the multicast route search are coupled in this order and defined as one route address. In accordance with the bit pattern of the route address, the multicast routing table is configured as a two-branch tree. Accordingly, even if the number of entries increases, the search process can be performed without prolonging a search time.

The number of branches of each node constituting a search tree is increased by a power of 2, from a conventional two-branch tree node to a four-branch tree node, an eight-branch tree node, or more. It is possible to check not one bit per one node, but consecutive two bits, three bits, or more at the same time. The number of nodes to the search completion therefore reduces and the route search process can be performed at high speed.

Figure 25:
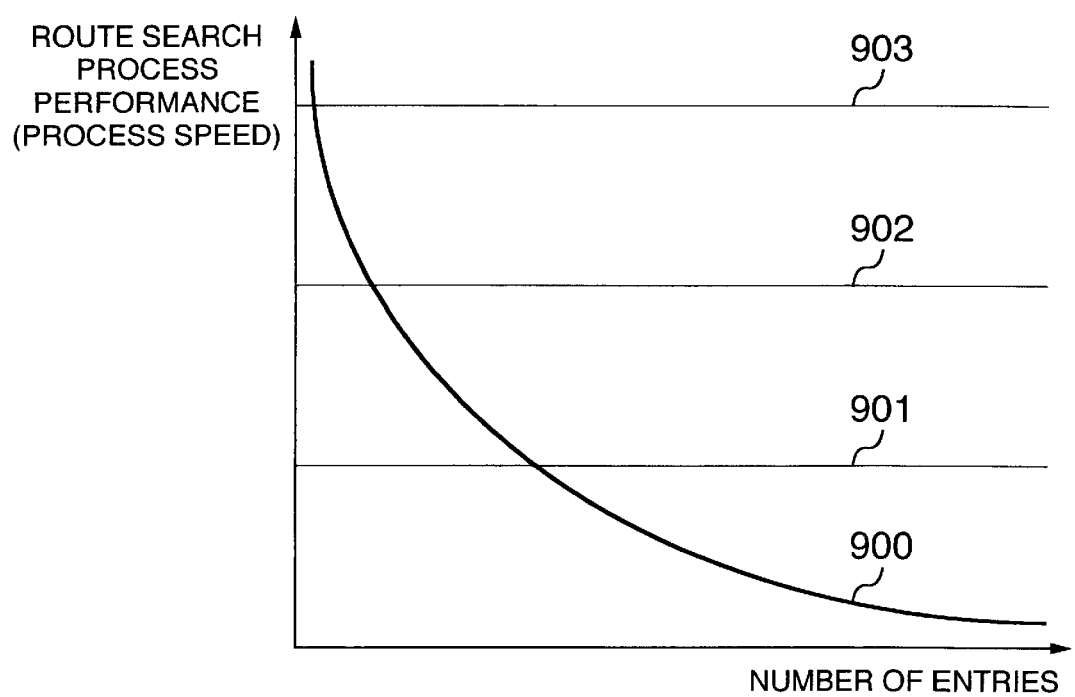
FIG. 25 is a graph showing the process performances of a hash type, a two-branch tree type, and a p-th power-of-2-branch tree type, relative to the number of entries.

FIG. 25 is a graph showing a multicast route search process performance 900 of the hash method of the second prior art, a multicast route search process performance 901 of the two-branch tree of this invention, a multicast route search process performance of the p-th power-of-2-branch tree of this invention (e.g., performance 902 of a four-branch tree, performance 903 of an eight-branch tree), relative to the number of entries. The process performance of the hash method degrades in inverse proportion with the number of entries, whereas the process performance of the two-branch tree and p-th power-of-2-branch tree is constant and does not depend upon the number of entries. The four-branch tree realizes the performance better than the two-branch tree by a twofold, and the eight-branch tree by a threefold.

As the route address, the multicast group address itself is not used but the multicast group ID of the lower 28 bits of the multicast group address and the sender IP address coupled in this order are used. In accordance with the bit pattern of this route address, the multicast routing-table is configured as a two-branch tree or a p-th power-of-2-branch tree. It is therefore possible to reduce the number of bits of the route address for determining the depth of a search tree and to reduce the maximum number of nodes to be traced.

In configuring a four-branch tree, an eight-branch tree or generally a p-th power-of-2-branch tree, a collection of one two-branch tree node and two-branch tree nodes of (p−1) stages, totalling in ((a p-th power of 2)−1) nodes just under the one upper node, is used as one p-th power-of-2-branch tree node. In this case, the (p−1)-th power of 2) two-branch nodes at the lowest stage collected are embedded with the entry data assigned to the nodes at the higher stages. Accordingly, the memory capacity corresponding to ((a p-th power of 2)−1) two-branch tree nodes before the collection can be reduced to the memory capacity corresponding to ((p−1)-th power of 2) two-branch tree nodes.

In converting two-branch tree nodes into a p-th power-of-2-branch tree, the transmission port information is separated from the node data of the search tree and stored in another area of a memory. As a result, the data amount of the two-branch tree node assigned an entry becomes equal to the data amount of the two-branch tree node not assigned an entry. In configuring a p-th power-of-2-branch tree nodes by collecting such two-branch tree nodes, the memory capacity for the p-th power-of-2-branch tree node can be reduced and the memory amount of each p-th power-of-2-branch tree node can be made equal.

All the data of the four-branch tree node, eight-branch tree node, or node having branches more than these configured by a collection of a plurality of two-branch tree nodes, is not read during the search, but only a necessary portion of the data is read. It is therefore possible to prevent a data read time from being made longer by a large node size and speed up the route search process.

Each node stores not the mask length of its own, but the mask length of a node connected just under the node. Accordingly, the mask length of the node can be known before the data of the node is read. Also, which area of the node is read can be known before the data of the node is actually read and only the necessary data can be read. It is therefore possible to prevent a data read time from being made longer by a large node size and speed up the route search process.

At the top of the data of each node, a flag is provided which indicates whether the node is assigned an entry. This flag is first read, and if the entry is not assigned, the route information of this node is not read. It is therefore possible to shorten a data read time and speed up the route search process.

Nodes corresponding in number to the upper several bits of the route address are developed on a memory at predetermined positions. In accordance with the upper several bits of the route address in a received packet, the memory area where the node data is stored is directly accessed. It is therefore possible to omit this search process time and the route search process can be performed at high speed.

Such high speed operation means may be realized by hardware to speed up the route search process.

What is claimed is:

1. A packet relaying apparatus for relaying a packet in a plurality of interconnected networks and for searching route information of a received multicast packet by using as a search key a receiver address and a sender address of the received multicast packet and transferring the multicast packet to one or a plurality of ports in accordance with the route information, the packet relaying apparatus comprises:

storage means for storing a search table of a two-branch tree structure corresponding to a bit pattern of a route address coupling the receiver address and the sender address in this order; and a circuit for searching a search tree of the two-branch tree structure stored in said storage means in accordance with a value of each bit checked starting from an m-th bit of the route address, by developing (m-th power of 2) two-branch tree nodes corresponding to the upper m bits of the route address on said storage means at predetermined positions, with each node being set in one-to-one correspondence with each value capable being taken by the 0-Ui to (m−1)-th bits of the route address, and by selecting one of the developed nodes in accordance with values of the 0th to (m−1)-th bits of the route address for searching the search tree.

2. A packet relaying apparatus for relaying a packet in a plurality of interconnected networks and for searching route information of a received multicast packet by using as a search key a receiver address and a sender address of the received multicast packet and transferring the multicast packet to one or a plurality of ports in accordance with the route information, the packet relaying apparatus comprises:

storage means for storing a search table of a p-th power-of-2-branch tree structure (p being a natural number) corresponding to a bit pattern of a route address coupling the receiver address and the sender address in this order; and a circuit for searching a search tree of the p-th power-of-2-branch tree structure stored in said storage means in accordance with values of p bits checked starting from an m-th bit of the route address, by developing (m-th power of 2) p-th power-of-2-branch tree nodes corresponding to the upper m bits of the route address on said storage means at predetermined positions, with each node being set in one-to-one correspondence with each value being taken by the O-th to (m−1)-th bits of the route address, and by selecting one of the developed nodes in accordance with values of the 0th to (m−1)-th bits of the route address for searching the search tree.

* * * * *